(12) United States Patent
Watanabe et al.

(10) Patent No.: US 6,236,469 B1
(45) Date of Patent: May 22, 2001

(54) COMMUNICATION APPARATUS

(75) Inventors: Keiji Watanabe, Yamatokoriyama; Makoto Nakabayashi, Nara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/152,251

(22) Filed: Sep. 11, 1998

(30) Foreign Application Priority Data

Oct. 24, 1997 (JP) .................................................... 9-292956

(51) Int. Cl.$^7$ ........................................................ H04N 1/32
(52) U.S. Cl. ................................................ 358/468; 358/434
(58) Field of Search .................................... 358/405, 407, 358/434, 435, 438, 439, 437, 468; 379/93.08, 100.01, 100.06, 100.09; 375/220, 225

(56) References Cited

U.S. PATENT DOCUMENTS

| | | | |
|---|---|---|---|
| 5,721,731 | * | 2/1998 | Yoshida ................................ 370/296 |
| 5,751,441 | * | 5/1998 | Morimoto ............................. 358/435 |
| 5,787,116 | * | 7/1998 | Lam ...................................... 375/222 |
| 6,021,183 | * | 1/2000 | Yoshida ............................. 379/93.08 |
| 6,075,620 | * | 6/2000 | Yoshida ................................ 358/434 |

FOREIGN PATENT DOCUMENTS

| | | | |
|---|---|---|---|
| 8-79483 | | 3/1996 | (JP) ................................. H04N/1/32 |
| 8-204684 | * | 8/1996 | (JP) ................................. H04N/1/32 |
| 8-214136 | | 8/1996 | (JP) ................................. H04N/1/32 |
| 9-186838 | * | 7/1997 | (JP) ................................. H04N/1/32 |
| 10-285375 | * | 10/1998 | (JP) ................................. H04N/1/32 |

* cited by examiner

Primary Examiner—Jerome Grant, II

(57) ABSTRACT

The present invention is intended to transmit and receive desired data at low communication cost by selecting Recommendation T.30 in accordance with the estimation of line condition during the execution of procedures of Recommendations V.8 and V.34. At a calling station, when a JM signal is not detected within a CM signal transmission time t1, when a phase 2 signal is not detected within a time t2 after the end of V.8, when a phase 3 signal is not detected within a time t3 after the end of the phase 2, when a phase 4 signal is not detected within a time t4 after the end of the phase 3, when a phase 6 signal is not detected within a time t5 after the end of the phase 5, or when the phase 4 signal is not detected within a time t6 after the end of the phases 6 and C, it is presumed that the line condition is improper and a procedure of Recommendation T.30 is executed. At a called station, when a CJ signal is not detected within a JM signal transmission time t7, when the phase 2 signal is not detected within a time t8 after the end of Recommendation V.8, when the phase 3 signal is not detected within a time t9 after the end of the phase 2, when the phase 4 signal is not detected within a time t10 after the end of the phase 3, when the phase 6 signal is not detected within a time t11 after the end of the phase 5, or when the phase 4 signal is not detected within a time t12 after the end of the phases 6 and C, it is presumed that the line condition is improper, and the procedure of Recommendation T.30 is executed.

12 Claims, 23 Drawing Sheets

COMMUNICATION APPARATUS

BACKGROUND OF THE INVENTION

1. Field of the Invention

The present invention provides a communication apparatus like a facsimile machine, which implements communication according to the procedures that are defined by Recommendations T.30, V.8 and V.34 of the ITU-T (International Telecommunication Union for Telecommunications).

2. Description of the Related Art

Recommendation T.30 of the ITU-T defines a procedure for transmitting text via facsimile over a public switched telephone network (PSTN), Recommendation V.8 specifies a session start procedure for data transmission over the PSTN, and Recommendation V.34 defines the specifications of a modem which operates at a data signal rate of up to 33600 bps that is used in the PSTN and a2-wire, point-to-point telephone-type private line.

With respect to a prior art disclosed in, For example, Japanese Unexamined Patent Publication JP-A-8-79483 (1996), a communication apparatus operable according to the procedure of Recommendation V.8 is permitted to receive data both from a station which is operable according to the procedure of Recommendation V.8 and a station which is operable according to the procedure of Recommendation T.30 in the following manner. When receiving a calling menu (CM) signal within a modulated answer tone (ANSam) transmission time, the device transmits a common menu (JM signal) to execute the procedure of Recommendation V.8. When the device cannot receive the CM signal within the ANSam transmission time, on the other hand, the device transmits a non-standard facilities (NSF), a called subscriber identification (CSI) and a digital identification (DIS) signals, and upon reception of the CM signal thereafter, the device transmits the JM signal and then executes the procedure of Recommendation V.8, while upon reception of a non-standard facilities set-up (NSS), a transmitting subscriber identification (TSI) and a digital command (DCS) signals instead of the CM signal, the device executes the procedure of Recommendation T.30.

In addition, Japanese Unexamined Patent Publication JP-A 8-214136(1996) discloses a technology, wherein if the JM signal from a called station cannot be received during the transmission of the CM signal from a calling station, the half-duplex transmission system is selected by switching after the end of the transmission of the CM signal in order to receive the JM signal; furthermore if the called station cannot receive the CM or CJ (CM terminator) signal during the transmission of the JM signal, the half-duplex transmission system is selected by switching after the end of the transmission of the JM signal in order to receive the CJ signal, thereby to effectively use the functions provided by Recommendation V.8.

In the case of a communication apparatus capable of carrying out communication in accordance with the procedures of Recommendations T.30, V8 and V34, while a communication line is connected and the procedures of Recommendations V8 and V34 are executed, the communication apparatus is configured so that the communication line can be disconnected in accordance with the procedures. Therefore, if the line condition is improper because of a low signal level or the like, the procedures cannot be interrupted in the middle of transmission, whereby a longer time may be taken to detect a desired signal, or communication errors may occur. In particular, the communication in accordance with the procedures of Recommendations V.8 and V34 is more susceptible to the line condition than the communication in accordance with the procedure of Recommendation T.30. For this reason, communication cost may increase, or desired data cannot be transmitted or received.

SUMMARY OF THE INVENTION

An object of the present invention is to provide a communication apparatus capable of securely transmitting and receiving desired data at low communication cost by estimating the line condition during the execution of the procedures of Recommendations V.8 and V.34 and by selecting the procedure of Recommendation T.30 in accordance with the condition.

The present invention provides a communication apparatus capable of carrying out communication with a destination communication apparatus in accordance with procedures of Recommendations T.30, V.8 and V.34 of ITU-T, comprising:

detection means for detecting a JM (common menu) signal from a called station within a predetermined transmission time t1 for a CM (calling menu) signal transmitted by the communication apparatus while a communication line connected from the communication apparatus used as a calling station to the called station and the procedure of Recommendation V.8 is executed; and control means for interrupting the execution of the procedure of Recommendation V.8 and executing the half-duplex communication operation in accordance with the procedure of Recommendation T.30, when the JM signal is not detected within the CM signal transmission time t1.

In accordance with the present invention, while the communication line is connected from the communication apparatus of the present invention capable of executing the procedures of Recommendations T.30, V.8 and V.34 and used as the calling station to the called station, and the procedure of Recommendation V.8 is executed, when the JM signal from the called station is not detected within the predetermined CM signal transmission time t1, it is estimated that the line condition is improper, and the half-duplex communication operation in accordance with the procedure of Recommendation T.30 instead of Recommendation V.8 is carried out. Therefore, desired data can be transmitted at low communication cost without prolonging communication time and without causing communication errors.

Furthermore, the present invention provides a communication apparatus capable of carrying out communication with a destination communication apparatus in accordance with procedures of Recommendations T.30, V.8 and V.34 of ITU-T, comprising:

detection means for detecting the phase 2 signal of Recommendation V.34 from a called station within a predetermined time t2 after the end of the procedure of Recommendation V.8 at the communication apparatus while a communication line is connected from the communication apparatus used as a calling station to the called station and the procedures of Recommendations V.8 and V.34 are executed; and control means for interrupting the execution of the procedure of Recommendation V.34 and executing the half-duplex communication operation in accordance with the procedure of Recommendation T.30, when the phase 2 of Recommendation V.34 is not detected within the predetermined time t2.

In accordance with the present invention, while the communication line is connected from the communication apparatus of the present invention capable of executing the procedures of Recommendations T.30, V.8 and V.34 and used as the calling station to the called station, and the procedures of Recommendations V.8 and V.34 are executed, when the phase 2 signal of Recommendation V.34 from the called station is not detected within the predetermined time t2 after the end of the procedure of Recommendation V.8, it is estimated that the line condition is improper, and the half-duplex communication operation in accordance with the procedure of Recommendation T.30 instead of Recommendation V.34 is carried out. Therefore, desired data can be transmitted at low communication cost without prolonging communication time and without causing communication errors.

Furthermore, the present invention provides a communication apparatus capable of carrying out communication with a destination communication apparatus in accordance with procedures of Recommendations T.30, V.8 and V.34 of ITU-T, comprising:

detection means for detecting the phase 3 signal of Recommendation V.34 from a called station within a predetermined time t3 after the end of phase 2 procedure of Recommendation V.34 at the communication apparatus while a communication line is connected from the communication apparatus used as a calling station to the called station and the procedures of Recommendations V.8 and V.34 are executed; and control means for interrupting the execution of the procedure of Recommendation V.34 and executing the half-duplex communication operation in accordance with the procedure of Recommendation T.30, when the phase 3 of Recommendation V.34 is not detected within the predetermined time t3.

In accordance with the present invention, while the communication line is connected from the communication apparatus of the present invention capable of executing the procedures of Recommendations T.30, V.8 and V.34 and used as the calling station to the called station and the procedures of Recommendations V.8 and V.34 are executed, when the phase 3 signal of Recommendation V.34 from the called station is not detected within the predetermined time t3 after the end of the procedure of the phase 2 of Recommendation V.34, it is estimated that the line condition is improper, and the half-duplex communication operation in accordance with the procedure of Recommendation T.30 instead of Recommendation V.34 is carried out. Therefore, desired data can be transmitted at low communication cost without prolonging communication time and without causing communication errors.

Furthermore, the present invention provides a communication apparatus capable of carrying out communication with a destination communication apparatus in accordance with procedures of Recommendations T.30, V.8 and V.34 of ITU-T, comprising:

detection means for detecting the phase 4 signal of Recommendation V.34 from a called station within a predetermined time t4 after the end of the procedure of the phase 3 of Recommendation V.34 at the communication apparatus while a communication line is connected from the communication apparatus used as a calling station to the called station and the procedures of Recommendations V.8 and V.34 are executed; and control means for interrupting the execution of the procedure of Recommendation V.34 and executing the half-duplex communication operation in accordance with the procedure of Recommendation T.30, when the phase 4 signal of Recommendation V.34 is not detected within the predetermined time t4.

In accordance with the present invention, while the communication line is connected from the communication apparatus of the present invention capable of executing the procedures of Recommendations T.30, V.8 and V.34 and used as the calling station to the called station and the procedures of Recommendations V.8 and V.34 are executed, when the phase 4 signal of Recommendation V.34 from the called station is not detected within the predetermined time t4 after the end of the procedure of the phase 3 of Recommendation V.34, it is estimated that the line condition is improper, and the half-duplex communication operation in accordance with the procedure of Recommendation T.30 instead of Recommendation V.34 is carried out. Therefore, desired data can be transmitted at low communication cost without prolonging communication time and without causing communication errors.

Furthermore, the present invention provides a communication apparatus capable of carrying out communication with a destination communication apparatus in accordance with procedures of Recommendations T.30, V.8 and V.34 of ITU-T, comprising:

detection means for detecting the phase 6 signal of Recommendation V.34 from a called station within a predetermined time t5 after the end of the procedure of the phase 5 (the phase B) of Recommendation V.34 at the communication apparatus while a communication line is connected from the communication apparatus used as a calling station to the called station and the procedures of Recommendations V.8 and V.34 are executed; and control means for interrupting the execution of the procedure of Recommendation V.34 and executing the half-duplex communication operation in accordance with the procedure of Recommendation T.30, when the phase 6 of Recommendation V.34 is not detected within the predetermined time t5.

In accordance with the present invention, while the communication line is connected from the communication apparatus of the present invention capable of executing the procedures of Recommendations T.30, V.8 and V.34 and used as the calling station to the called station and the procedures of Recommendations V.8 and V.34 are executed, when the phase 6 signal of Recommendation V.34 from the called station is not detected within the predetermined time t5 after the end of the procedure of the phase 5 (the phase B) of Recommendation V.34, it is estimated that the line condition is improper, and the half-duplex communication operation in accordance with the procedure of Recommendation T.30 instead of Recommendation V.34 is carried out. Therefore, desired data can be transmitted at low communication cost without prolonging communication time and without causing communication errors.

Furthermore, the present invention provides a communication apparatus capable of carrying out communication with a destination communication apparatus in accordance with procedures of Recommendations T.30, V.8 and V.34 of ITU-T, comprising:

detection means for detecting the phase 4 (a procedure before the phase D) signal of Recommendation V.34 from a called station within a predetermined time t6 after the end of the procedures of the phase 6 and the phase C of Recommendation V.34 at the communication apparatus while a communication line is connected from the communication apparatus used as a calling station to the called station and the procedures of Recommendations V.8 and V.34 are executed; and control means for interrupting the execution of the procedure of Recommendation V.34 and executing the half-duplex communication operation in accordance with the procedure of Recommendation T.30 when the phase 4 signal of Recommendation V.34 is not detected within the predetermined time t6.

In accordance with the present invention, while the communication line is connected from the communication apparatus of the present invention capable of executing the procedures of Recommendations T.30, V.8 and V.34 and used as the calling station to the called station and the procedures of Recommendations V.8 and V.34 are executed, when the phase 4 (the procedure before the phase D) signal of Recommendation V.34 from the called station is not detected within the predetermined time t6 after the end of the procedures of the phase 6 and the phase C of Recommendation V.34, it is estimated that the line condition is improper, and the half-duplex communication operation in accordance with the procedure of Recommendation T.30 instead of Recommendation V.34 is carried out. Therefore, desired data can be transmitted at low communication cost without prolonging communication time and without causing communication errors.

In addition, the present invention provides a communication apparatus capable of carrying out communication with a destination communication apparatus in accordance with procedures of Recommendations T.30, V.8 and V.34 of ITU-T, comprising:

detection means for detecting a CJ (CM terminator) signal from a calling station within a predetermined transmission time t7 for a JM (common menu) signal transmitted by the communication apparatus while a communication line is connected from the communication apparatus used as a called station to the calling station and the procedure of Recommendation V.8 is executed; and control means for interrupting the execution of the procedure of Recommendation V.8 and executing the half-duplex communication operation in accordance with the procedure of Recommendation T.30, when the CJ signal is not detected within the JM signal transmission time t7.

In accordance with the present invention, while the communication line is connected from the communication apparatus of the present invention capable of executing the procedures of Recommendations T.30, V.8 and V.34 and used as the called station to the calling station and the procedure of Recommendation V.8 is executed, when the CJ signal from the calling station is not detected within the predetermined JM signal transmission time t7, it is estimated that the line condition is improper, and the half-duplex communication operation in accordance with the procedure of Recommendation T.30 instead of Recommendation V.8 is carried out. Therefore, desired data can be received at low communication cost without prolonging communication time and without causing communication errors.

Furthermore, the present invention provides a communication apparatus capable of carrying out communication with a destination communication apparatus in accordance with procedures of Recommendations T.30, V.8 and V.34 of ITU-T, comprising:

detection means for detecting the phase 2 signal of Recommendation V.34 from a calling station within a predetermined time t8 after the end of the procedure of Recommendation V.8 at the communication apparatus while a communication line is connected from the communication apparatus used as a called station to the calling station and the procedures of Recommendations V.8 and V.34 are executed; and control means for interrupting the execution of the procedure of Recommendation V.34 and executing the half-duplex communication operation in accordance with the procedure of Recommendation T.30, when the phase 2 signal of Recommendation V.34 is not detected within the predetermined time t8.

In accordance with the present invention, while the communication line is connected from the communication apparatus of the present invention capable of executing the procedures of Recommendations T.30, V.8 and V.34 and used as the called station to the calling station and the procedures of Recommendation V.8 and V.34 are executed, when the phase 2 signal of Recommendation V.34 from the calling station is not detected within the predetermined time t8 after the end of the procedure of Recommendation V.8, it is estimated that the line condition is improper, and the half-duplex communication operation in accordance with the procedure of Recommendation T.30 instead of Recommendation V.8 is carried out. Therefore, desired data can be received at low communication cost without prolonging communication time and without causing communication errors.

Furthermore, the present invention provides a communication apparatus capable of carrying out communication with a destination communication apparatus in accordance with procedures of Recommendations T.30, V.8 and V.34 of ITU-T, comprising:

detection means for detecting the phase 3 signal of Recommendation V.34 from a calling station within a predetermined time t9 after the end of the procedure of the phase 2 of Recommendation V.34 at the communication apparatus while a communication line is connected from the communication apparatus used as a called station to the calling station and the procedures of Recommendations V.8 and V.34 are executed; and control means for interrupting the execution of the procedure of Recommendation V.34 and executing the half-duplex communication operation in accordance with the procedure of Recommendation T.30, when the phase 3 signal of Recommendation V.34 is not detected within the predetermined time t9.

In accordance with the present invention, while the communication line is connected from the communication apparatus of the present invention capable of executing the procedures of Recommendations T.30, V.8 and V.34 and used as the called station to the calling station and the procedures of Recommendation V.8 and V.34 are executed, when the phase 3 signal of Recommendation V.34 from the calling station is not detected within the predetermined time t9 after the end of the procedure of the phase 2 of Recommendation V.34, it is estimated that the line condition is improper, and the half-duplex communication operation in accordance with the procedure of Recommendation T.30 instead of Recommendation V.8 is carried out. Therefore, desired data can be received at low communication cost without prolonging communication time and without causing communication errors.

Furthermore, the present invention provides a communication apparatus capable of carrying out communication with a destination communication apparatus in accordance with procedures of Recommendations T.30, V.8 and V.34 of ITU-T, comprising:

detection means for detecting the phase 4 signal of Recommendation V.34 from a calling station within a predetermined time t10 after the end of the procedure of the phase 3 of Recommendation V.34 at the communication apparatus while a communication line is connected from the communication apparatus used as a called station to the calling station and the procedures of Recommendations V.8 and V.34 are executed; and control means for interrupting the execution of the procedure of Recommendation V.34 and executing the half-duplex communication operation in accordance with the procedure of Recommendation T.30, when the phase 4 signal of Recommendation V.34 is not detected within the predetermined time t10.

In accordance with the present invention, while the communication line is connected from the communication apparatus of the present invention capable of executing the procedures of Recommendations T.30, V.8 and V.34 and used as the called station to the calling station and the procedures of Recommendation V.8 and V.34 are executed, when the phase 4 signal of Recommendation V.34 from the calling station is not detected within the predetermined time t10 after the end of the procedure of the phase 3 of Recommendation V.34, it is estimated that the line condition is improper, and the half-duplex communication operation in accordance with the procedure of Recommendation T.30 instead of Recommendation V.8 is carried out. Therefore, desired data can be received at low communication cost without prolonging communication time and without causing communication errors.

Furthermore, the present invention provides a communication apparatus capable of carrying out communication with a destination communication apparatus in accordance with procedures of Recommendations T.30, V.8 and V.34 of ITU-T, comprising:

detection means for detecting the phase 6 signal of Recommendation V.34 from a calling station within a predetermined time t11 after the end of the procedure of the phase 5 (the phase B) of Recommendation V.34 at the communication apparatus while a communication line is connected from the communication apparatus used as a called station to the calling station and the procedures of Recommendations V.8 and V.34 are executed; and control means for interrupting the execution of the procedure of Recommendation V.34 and executing the half-duplex communication operation in accordance with the procedure of Recommendation T.30, when the phase 6 signal of Recommendation V.34 is not detected within the predetermined time t11.

In accordance with the present invention, while the communication line is connected from the communication apparatus of the present invention capable of executing the procedures of Recommendations T.30, V.8 and V.34 and used as the called station to the calling station and the procedures of Recommendations V.8 and V.34 are executed, when the phase 6 signal of Recommendation V.34 from the calling station is not detected within the predetermined time t11 after the end of the procedure of the phase 5 (the phase B) of Recommendation V.34, it is estimated that the line condition is improper, and the half-duplex communication operation in accordance with the procedure of Recommendation T.30 instead of Recommendation V.8 is carried out. Therefore, desired data can be received at low communication cost without prolonging communication time and without causing communication errors.

Furthermore, the present invention provides a communication apparatus capable of carrying out communication with a destination communication apparatus in accordance with procedures of Recommendations T.30, V.8 and V.34 of ITU-T, comprising:

detection means for detecting the phase 4 (the procedure before the phase D) signal of Recommendation V.34 from a calling station within a predetermined time t12 after the end of the procedures of the phase 6 and the phase C of Recommendation V.34 at the communication apparatus while a communication line is connected from the communication apparatus used as a called station to the calling station and the procedures of Recommendations V.8 and V.34 are executed; and control means for interrupting the execution of the procedure of Recommendation V.34 and executing the half-duplex communication operation in accordance with the procedure of Recommendation T.30, when the phase 4 signal of Recommendation V.34 is not detected within the predetermined time t12.

In accordance with the present invention, while the communication line is connected from the communication apparatus of the present invention capable of executing the procedures of Recommendations T.30, V.8 and V.34 and used as the called station to the calling station and the procedures of Recommendations V.8 and V.34 are executed, when the phase 4 (the procedure before the phase D) signal of Recommendation V.34 from the calling station is not detected within the predetermined time t12 after the end of the procedures of the phase 6 and the phase C of Recommendation V.34, it is estimated that the line condition is improper, and the half-duplex communication operation in accordance with the procedure of Recommendation T.30 instead of Recommendation V.8 is carried out. Therefore, desired data can be received at low communication cost without prolonging communication time and without causing communication errors.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
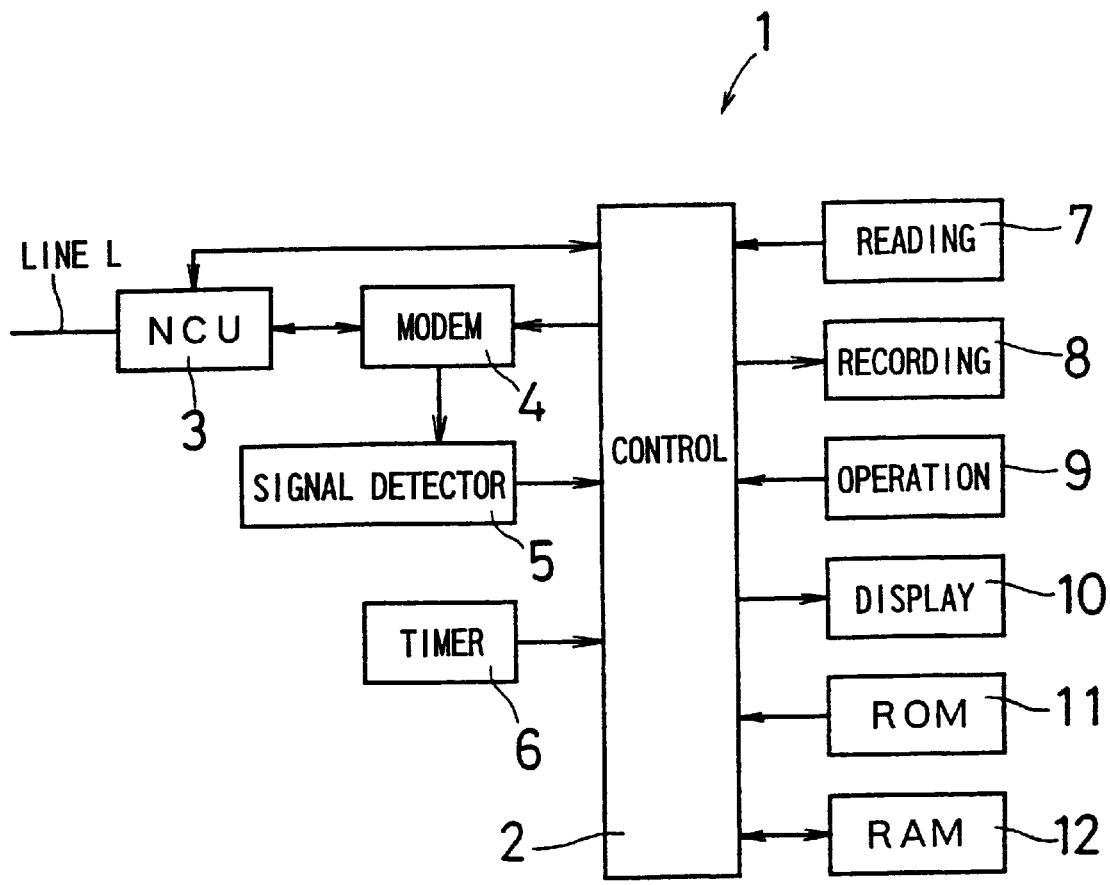
FIG. 1 is a block diagram showing the electric structure of a communication apparatus 1 according to one embodiment of the invention.

Now referring to the drawings, preferred embodiments of the invention are described below.

FIG. 1 presents a block diagram showing the electric structure of a communication apparatus 1 according to one embodiment of the invention. This communication apparatus 1 is communicatable with a destination communication apparatus according to the procedures of Recommendations T.30, V.8 and V.34 of the ITU-T. A control circuit 2, which may be comprised of a CPU (Central Processing Unit), controls the operations of an NCU (Network Control Unit) 3, a modem 4, a signal detector 5, a timer 6, a read unit 7, a record unit 8, an operation unit 9 and a display unit 10, all connected to the control circuit 2, in accordance with a program which is stored in a ROM (Read Only Memory) 11 to control the operation of the entire apparatus. A RAM (Random Access Memory) 12 temporarily stores various kinds of information for operational control. The NCU 3 controls a connection to a communication line L, as well as transmits a dial pulse corresponding with a destination communication apparatus and detects an incoming signal. Transmission data, modulated by the modem 4, is supplied to the NCU 3, and data received by the NCU 3 is given to the modem 4 to be demodulated.

The signal detector 5 detects various sorts of procedure signals from received data supplied to the modem 4 and gives the detection result to the control circuit 2. The control circuit 2 controls the operation of the modem 4 based on the detection result.

Particularly when the communication apparatus 1 is used as a calling station, the signal detector 5 detects the JM signal from a called station within the predetermined CM signal transmission time t1. Alternatively, the signal detector 5 detects the phase 2 signal of Recommendation V.34 from the called station within the predetermined time t2 after the end of the procedure of Recommendation V.8. Alternatively, the signal detector 5 detects the phase 3 signal of Recommendation V.34 from the called station within the predetermined time t3 after the end of phase 2 procedure of Recommendation V.34. Alternatively, the signal detector 5 detects the phase 4 signal of Recommendation V.34 from the called station within the predetermined time t4 after the end of phase 3 procedure of Recommendation V.34. Alternatively, the signal detector 5 detects the phase 6 signal of Recommendation V.34 from the called station within the predetermined time t5 after the end of phase 5 (phase B) procedure of Recommendation V.34. Alternatively, the signal detector 5 detects the phase 4 (the procedure before the phase D) signal of Recommendation V.34 from the called station within the predetermined time t6 after the end of phase 6 and phase C procedures of Recommendation V.34. In the communication apparatus 1 of the present embodiment, all of these signals are detected.

In addition, when the communication apparatus 1 is used as a called station, the signal detector 5 detects the CJ signal from a calling station within the predetermined JM signal transmission time t7. Alternatively, the signal detector 5 detects the phase 2 signal of Recommendation V.34 from the calling station within the predetermined time t8 after the end of the procedure of Recommendation V.8. Alternatively, the signal detector 5 detects the phase 3 signal of Recommendation V.34 from the calling station within the predetermined time t9 after the end of phase 2 procedure of Recommendation V.34. Alternatively, the signal detector 5 detects the phase 4 signal of Recommendation V.34 from the calling station within the predetermined time t10 after the end of phase 3 procedure of Recommendation V.34. Alternatively, the signal detector 5 detects the phase 6 signal of Recommendation V.34 from the calling station within the predetermined time t11 after the end of phase 5 (phase B) procedure of Recommendation V.34. Alternatively, the signal detector 5 detects the phase 4 (the procedure before the phase D) signal of Recommendation V.34 from the calling station within the predetermined time t12 after the end of phase 6 and phase C procedures of Recommendation V.34. In the communication apparatus 1 of the present embodiment, all of these signals are detected.

The timer 6 measures the times t1 to t12, and also measures predetermined times required for the transmission and reception of various signals.

The communication apparatus 1 according to this embodiment has a facsimile function and the read unit 7 reads an image on an original. The record unit 8 prints and records received image data or image data, read by the read unit 7, on a predetermined recording sheet. The operation unit 9 has dial keys for input a telephone number for specifying the destination communication apparatus, and a start key for initiating the operation of the facsimile communication. The display unit 10 displays various kinds of information.

Figure 2:
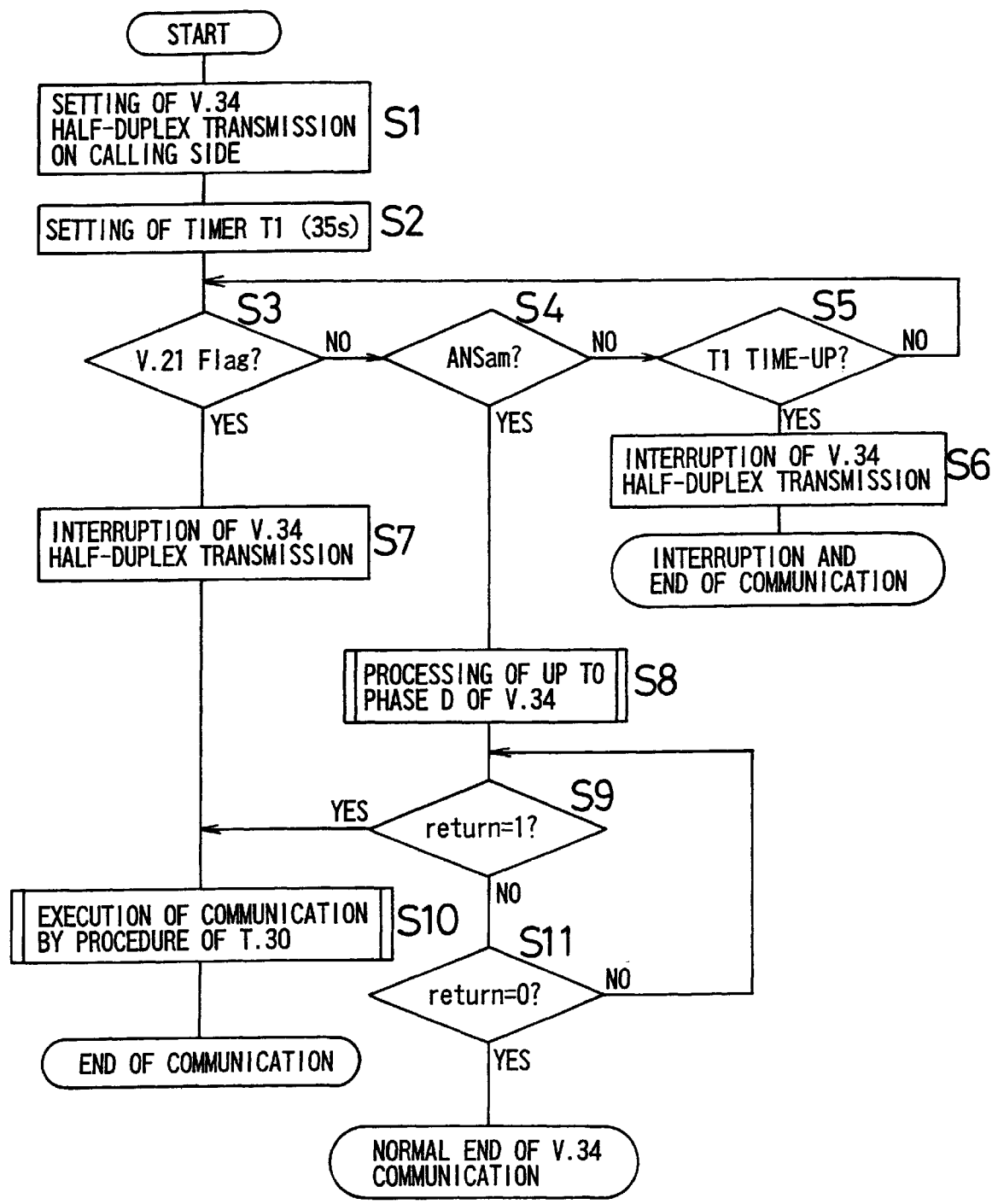
FIG. 2 is a flowchart for explaining the communication operation of the communication apparatus 1 used as a calling station.

FIG. 2 is a flowchart for explaining the communication operation of the communication apparatus 1 used as the calling station. At step S1 after the line L is connected between the communication apparatus 1 and a destination communication apparatus, various communication conditions are set in order to execute communication in accordance with the procedures of Recommendations V.8 and V.34. Next, at step S2, a predetermined signal transmission time T1 defined by Recommendation T.30 is set on the timer 6, and the time T1 is begun to be measured. At step S3, a judgment is made to determine whether the signal (flag) of the channel 2 of V.21 of Recommendation T.30 is detected or not. If the signal is detected, the sequence proceeds to step S7, and the execution of the procedures of Recommendations V.8 and V.34 is interrupted. The sequence further proceeds to step S10, the procedure of Recommendation T.30 is executed, and the communication operation is ended. If the signal of the channel 2 of V.21 of Recommendation T.30 is not detected at step S3, the sequence proceeds to step S4.

At step S4, a judgment is made to determine whether the ANSam signal of Recommendation V.8 is detected or not. If the signal is not detected, the sequence proceeds to step S5, and the judgement operations at steps S3 and S4 are repeated until the predetermined signal transmission time T1 is up. When the time T1 is up, the sequence proceeds to step S6, the execution of the procedures of Recommendations V.8 and V.34 is interrupted, the line is disconnected, and the communication operation is interrupted and ended.

If the ANSam signal is detected at step S4, the sequence proceeds to step S8, and the processing of up to the phase D of Recommendations V.8 and V.34 is executed. The sequence then proceeds to step S9, and a judgment is made to determine whether a parameter return obtained by the processing is 1 or not. If the parameter is 1, the sequence proceeds to step S10, the procedure of Recommendation T.30 is executed, and the communication operation is ended. If the parameter is not 1, the sequence proceeds to step S11, and a judgment is made to determine whether the parameter return is 0 or not. If the parameter is 0, the procedures of Recommendations V.8 and V.34 are executed completely, and the communication operation is ended normally. If the parameter is not 0, the sequence returns to step S9.

Figure 3:
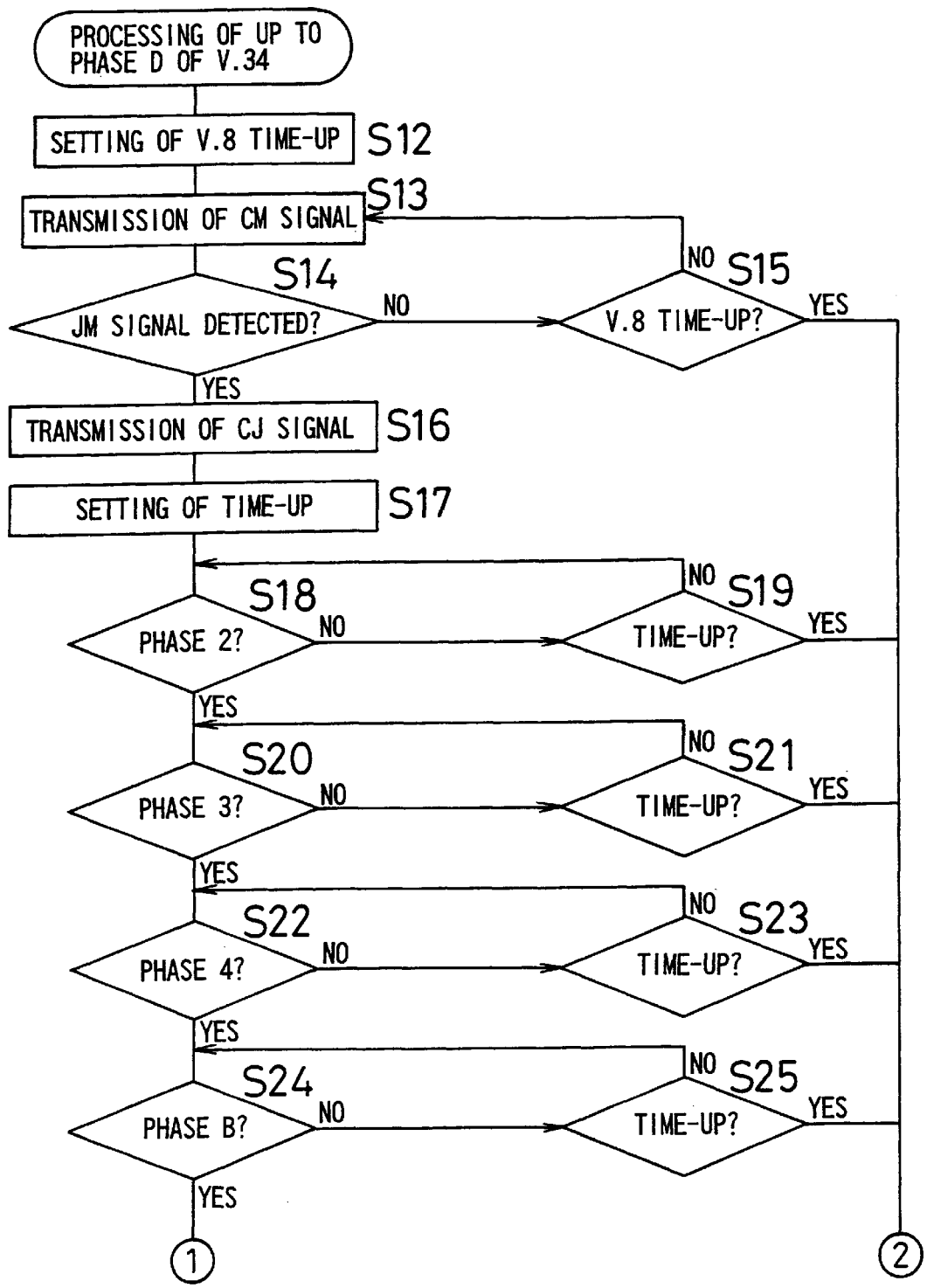
FIG. 3 is a flowchart for explaining the processing of up to the phase D of the procedures of Recommendations V.8 and V.34 at step S8 shown in FIG. 2.
Figure 4:
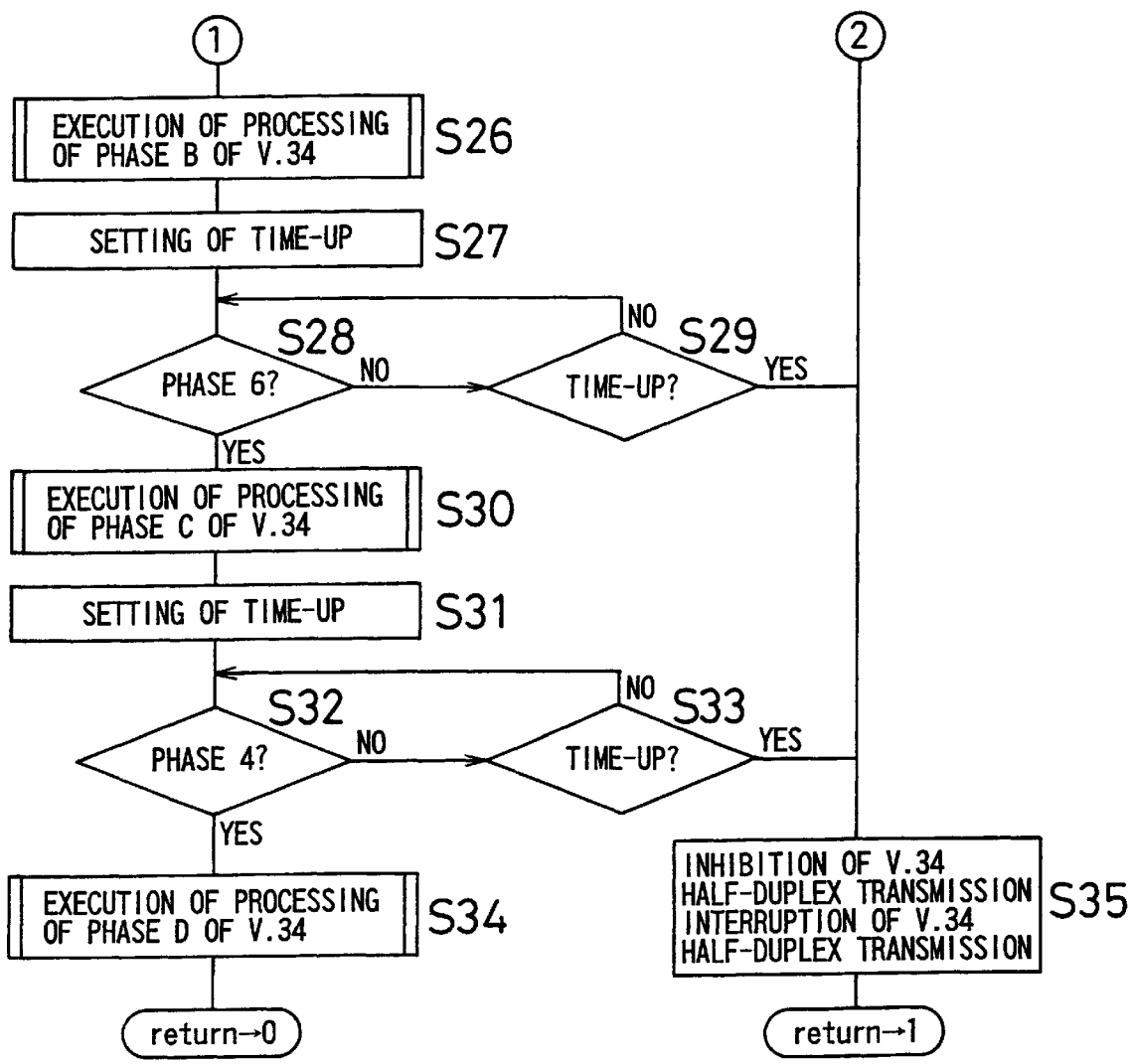
FIG. 4 is a flowchart for explaining the processing of up to the phase D of the procedures of Recommendations V.8 and V.34 at step S8 shown in FIG. 2.

FIGS. 3 and 4 are flowcharts for explaining the processing of up to the phase D of Recommendations V.8 and V.34 to be executed at step S8 shown in FIG. 2. At step 12, the predetermined V.8 time-up time t1, i.e., the CM signal transmission time t1 is set on the timer 6, and the time t1 is begun to be measured. Next, at step S13, the CM signal is transmitted. In addition, at step S14, a judgment is made to determine whether the JM signal from the destination communication apparatus used as the called station is detected or not. If the signal is detected, the sequence proceeds to step S16. If the signal is not detected, the sequence proceeds to step 15, and the operations at steps S13 and S14 are repeated until the CM signal transmission time t1 is up. When the time is up, that is, when the JM signal is not detected within the predetermined CM signal transmission time t1, the sequence proceeds to step S35, and the execution of the procedures of Recommendations V.8 and V.34 is inhibited and interrupted. The parameter return is then set at 1, and the operation is ended.

If the JM signal is detected within the predetermined CM signal transmission time t1, the CJ signal is transmitted at step S16. Next, at step S17, the predetermined time t2 is set on the timer 6, and the time t2 is begun to be measured. Furthermore, at step S18, a judgment is made to determine whether the phase 2 signal of Recommendation V.34 from the destination communication apparatus used as the called station is detected or not. If the signal is detected, the timer 6 is reset, and the predetermined time t3 is set on the timer 6. The time t3 is begun to be measured, and the sequence proceeds to step S20. If the signal is not detected, the sequence proceeds to step S19. The judgment operation at step S18 is repeated until the time t2 is up at step S19. When the time t2 is up, the sequence proceeds to step 35.

At step S20, a judgment is made to determine whether the phase 3 signal of Recommendation V.34 from the destination communication apparatus used as the called station is detected or not. If the signal is detected, the timer 6 is reset, and the predetermined time t4 is set on the timer 6. The time t4 is begun to be measured, and the sequence proceeds to step S22. If the signal is not detected, the sequence proceeds to step S21. The judgment operation at step S20 is repeated until the time t3 is up at step S21. When the time t3 is up, the sequence proceeds to step 35.

At step S22, a judgment is made to determine whether the phase 4 signal of Recommendation V.34 from the destination communication apparatus used as the called station is detected or not. If the signal is detected, the timer 6 is reset, and a predetermined time x1 is set on the timer 6. The time x1 is begun to be measured, and the sequence proceeds to step S24. If the signal is not detected, the sequence proceeds to step S23. The judgment operation at step S22 is repeated until the time t4 is up at step S23. When the time t4 is up, the sequence proceeds to step 35.

At step S24, a judgment is made to determine whether the phase 5 (the phase B) signal of Recommendation V.34 from the destination communication apparatus used as the called station is detected or not. If the signal is detected, the sequence proceeds to step S26. If the signal is not detected, the sequence proceeds to step S25. The judgment operation at step S24 is repeated until the time x1 is up at step S25. When the time x1 is up, the sequence proceeds to step 35.

At step S26, the processing of the phase B is executed. Next, at step S27, the predetermined time t5 is set on the timer 6, and the time t5 is begun to be measured. Furthermore, at step S28, a judgment is made to determine whether the phase 6 signal of Recommendation V.34 from the destination communication apparatus used as the called station is detected or not. If the signal is detected, the sequence proceeds to step S30. If the signal is not detected, the sequence proceeds to step S29. The judgment operation at step S28 is repeated until the time t5 is up at step S29. When the time t5 is up, the sequence proceeds to step 35.

At step S30, the processing of the phase C is executed. Next, at step S31, the predetermined time t6 is set on the timer 6, and the time t6 is begun to be measured. Furthermore, at step S32, a judgment is made to determine whether the phase 4 (the procedure before the phase D) signal of Recommendation V.34 from the destination communication apparatus used as the called station is detected or not. If the signal is detected, the sequence proceeds to step S34. If the signal is not detected, the sequence proceeds to step S33. The judgment operation at step S32 is repeated until the time t6 is up at step S33. When the time t6 is up, the sequence proceeds to step 35. At step S34, the processing of the phase D is executed, the parameter return is set at 0, and the operation is ended.

Figure 5:
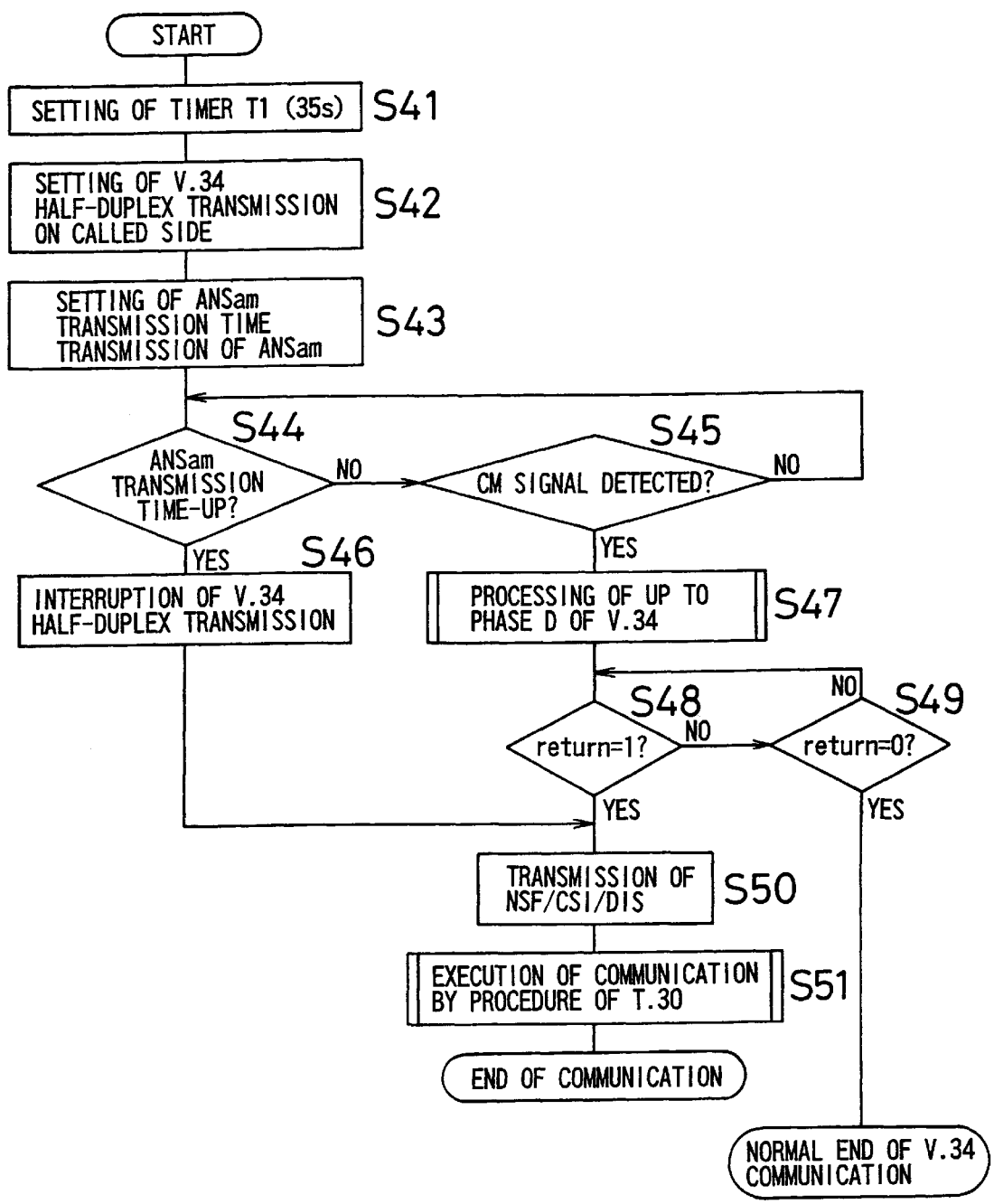
FIG. 5 is a flowchart for explaining the communication operation of the communication apparatus 1 serving as a called station.

FIG. 5 is a flowchart for explaining the communication operation of the communication apparatus 1 used as the called station. At step S41 after the line L is connected between the communication apparatus 1 and the destination communication apparatus, the predetermined signal transmission time T1 defined by Recommendation T.30 is set on the timer 6, and the time T1 is begun to be measured. Next, at step S42, various communication conditions are set in order to execute communication in accordance with the procedures of Recommendations V.8 and V.34. In addition, at step S43, a predetermined ANSam signal transmission time x2 defined by Recommendation V.8 is set on the timer 6, the time x2 is begun to be measured, and the ANSam signal is transmitted. Furthermore, at step S44, a Judgment is made to determine whether the time x2 is up or not. If the time X2 is up, the sequence proceeds to step S46, and the execution of the procedures of Recommendations V.8 and V.34 is interrupted. The sequence further proceeds to step S50, and the NSF, CSI and DIS signals are transmitted. The sequence further proceeds to step S51, the procedure of Recommendation T.30 is executed, and the communication operation is ended. If the time is not up at step S44, the sequence proceeds to step S45.

At step S45, a judgment is made to determine whether the CM signal is detected or not. If the signal is not detected, the sequence returns to step S44. If the signal is detected, the sequence proceeds to step S47, and the processing of up to the phase D of Recommendations V.8 and V.34 is executed. Next, the sequence proceeds to step S48, and a judgment is made to determine whether the parameter return obtained by the processing is 1 or not. If the parameter is 1, the sequence proceeds to step S50, and the NSF, CSI and DIS signals are transmitted. The sequence further proceeds to step S51, the procedure of Recommendation T.30 is executed, and the communication operation is ended. If the parameter is not 1, the sequence proceeds to step S49, and a judgment is made to determine whether the parameter return is 0 or not. If the parameter is 0, the procedures of Recommendations V.8 and V.34 are executed completely, and the communication operation is ended normally. If the parameter is not 0, the sequence returns to step S48.

Figure 6:
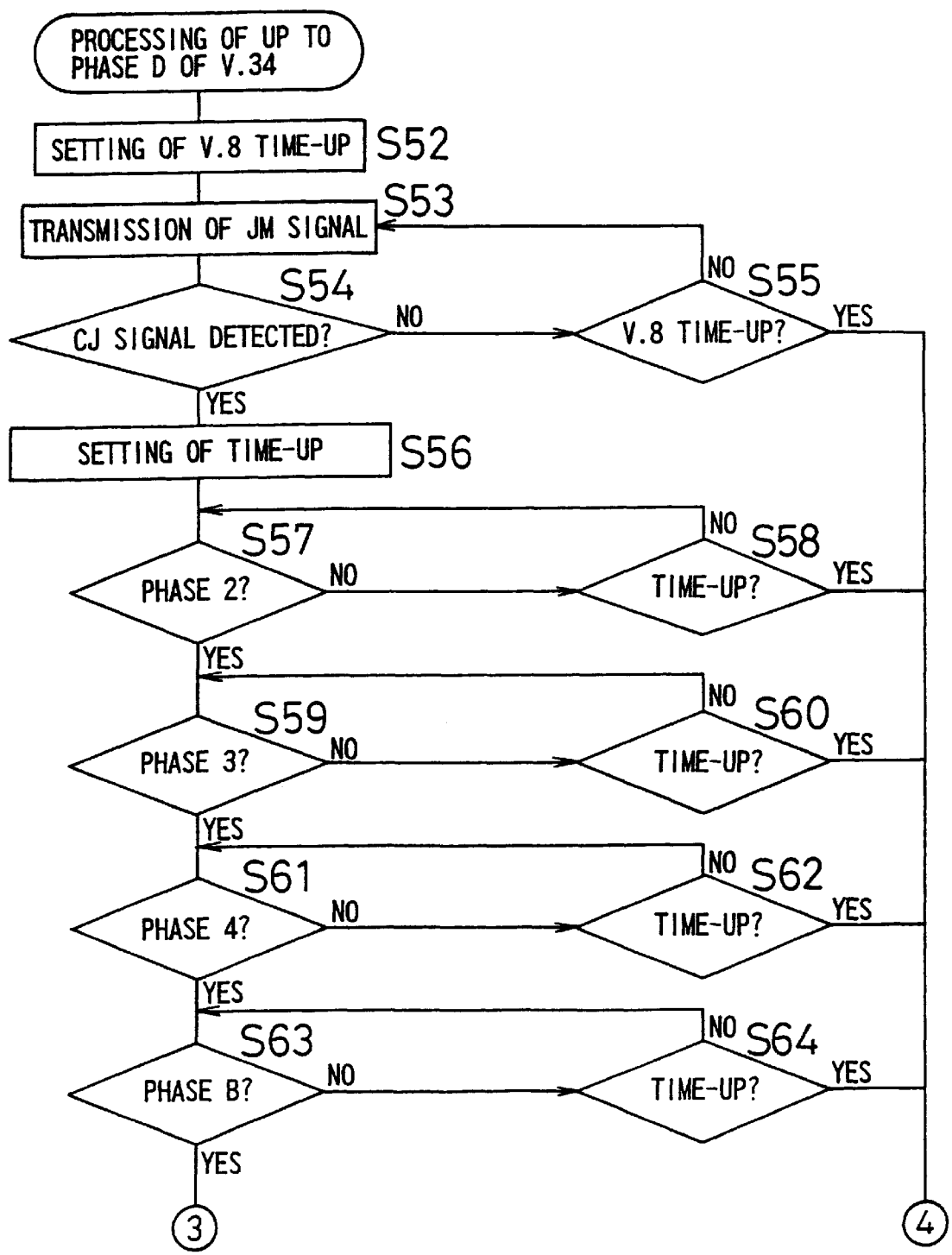
FIG. 6 is a flowchart for explaining the processing of up to the phase D of the procedures of Recommendations V.8 and V.34 at step S47 shown in FIG. 5.
Figure 7:
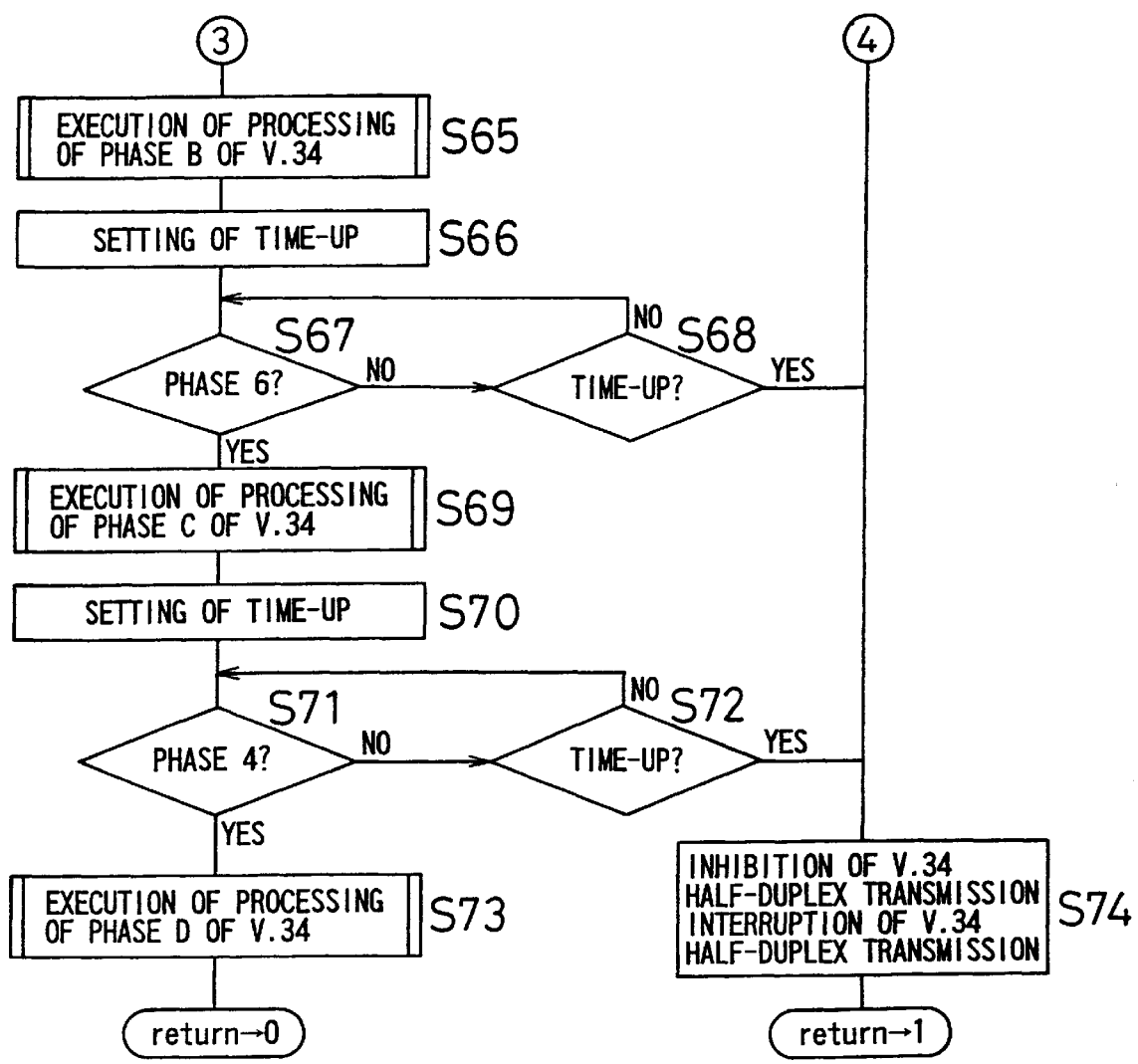
FIG. 7 is a flowchart for explaining the processing of up to the phase D of the procedures of Recommendations V.8 and V.34 at step S47 shown in FIG. 5.

FIGS. 6 and 7 are flowcharts for explaining the processing of up to the phase D of Recommendations V.8 and V.34 to be executed at step S47 shown in FIG. 5. At step 52, the predetermined V.8 time-up time t7, i.e.. the transmission time t7 for the JM signal is set on the timer 6, and the time t7 is begun to be measured. Next, at step S53, the JM signal is transmitted. In addition, at step S54, a judgment is made to determine whether the CJ signal from the destination communication apparatus used as the calling station is detected or not. If the signal is detected, the sequence proceeds to step S56. If the signal is not detected, the sequence proceeds to step 55 and the operations at steps S53 and S54 are repeated until the JM signal transmission time t7 is up. When the time is up, that is, when the CJ signal is not detected within the predetermined JM signal transmission time t7, the sequence proceeds to step S74, the execution of the procedures of Recommendations V.8 and V.34 is prohibited and interrupted. The parameter return is then set at 1, and the operation is ended.

If the CJ signal is detected within the predetermined JM signal transmission time t7, the predetermined time t8 is set on the timer 6 at step S56, and the time t8 is begun to be measured. In addition, at step S57, a judgment is made to determine whether the phase 2 signal of Recommendation V.34 from the destination communication apparatus used as the calling station is detected or not. If the signal is detected, the timer 6 is reset, the predetermined time t9 is set on the timer 6, the time t9 is begun to be measured, and the sequence proceeds to step S59. If the signal is not detected, the sequence proceeds to step S58. The judgment operation at step S57 is repeated until the time t8 is up at step S58. When the time is up, the sequence proceeds to step S74.

At step S59, a judgment is made to determine whether the phase 3 signal of Recommendation V.34 from the destination communication apparatus used as the calling station is detected or not. If the signal is detected, the timer 6 is reset, the predetermined time t10 is set on the timer 6, the time t10 is begun to be measured, and the sequence proceeds to step S61. If the signal is not detected, the sequence proceeds to step S60. The judgment operation at step S59 is repeated until the time t9 is up at step S60. When the time is up, the sequence proceeds to step S74.

At step S61, a judgment is made to determine whether the phase 4 signal of Recommendation V.34 from the destination communication apparatus used as the calling station is detected or not. If the signal is detected, the timer 6 is reset, a predetermined time x3 is set on the timer 6, the time x3 is begun to be measured, and the sequence proceeds to step S63. If the signal is not detected, the sequence proceeds to step S62. The judgment operation at step S61 is repeated until the time t10 is up at step S62. When the time is up, the sequence proceeds to step S74.

At step S63, a judgment is made to determine whether the phase 5 (the phase B) signal of Recommendation V.34 from the destination communication apparatus used as the calling station is detected or not. If the signal is detected, the sequence proceeds to step S65. If the signal is not detected, the sequence proceeds to step S64. The judgment operation at step S63 is repeated until the time x3 is up at step S64. When the time is up, the sequence proceeds to step S74.

At step S65, the processing of phase B is executed. Next, at step S66, the predetermined time t11 is set on the timer 6, and the time t11 is begun to be measured. In addition, at step S67, a judgment is made to determine whether the phase 6 signal of Recommendation V.34 from the destination communication apparatus used as the calling station is detected or not. If the signal is detected, the sequence proceeds to step S69. If the signal is not detected, the sequence proceeds to step S68. The judgment operation at step S67 is repeated until the time t11 is up at step S68. When the time is up, the sequence proceeds to step S74.

At step S69, the processing of the phase C is executed. Next, at step S70, the predetermined time t12 is set on the timer 6, and the time t12 is begun to be measured. In addition, at step S71, a judgment is made to determine whether the phase 4 (the procedure before the phase D) signal of Recommendation V.34 from the destination communication apparatus used as the calling station is detected or not. If the signal is detected, the sequence proceeds to step S73. If the signal is not detected, the sequence proceeds to step S72. The judgment operation at step S71 is repeated until the time t12 is up at step S72. When the time is up, the sequence proceeds to step S74. At step 73, the processing of the phase D is executed, the parameter return is set at 0, and the operation is ended.

Figure 8:
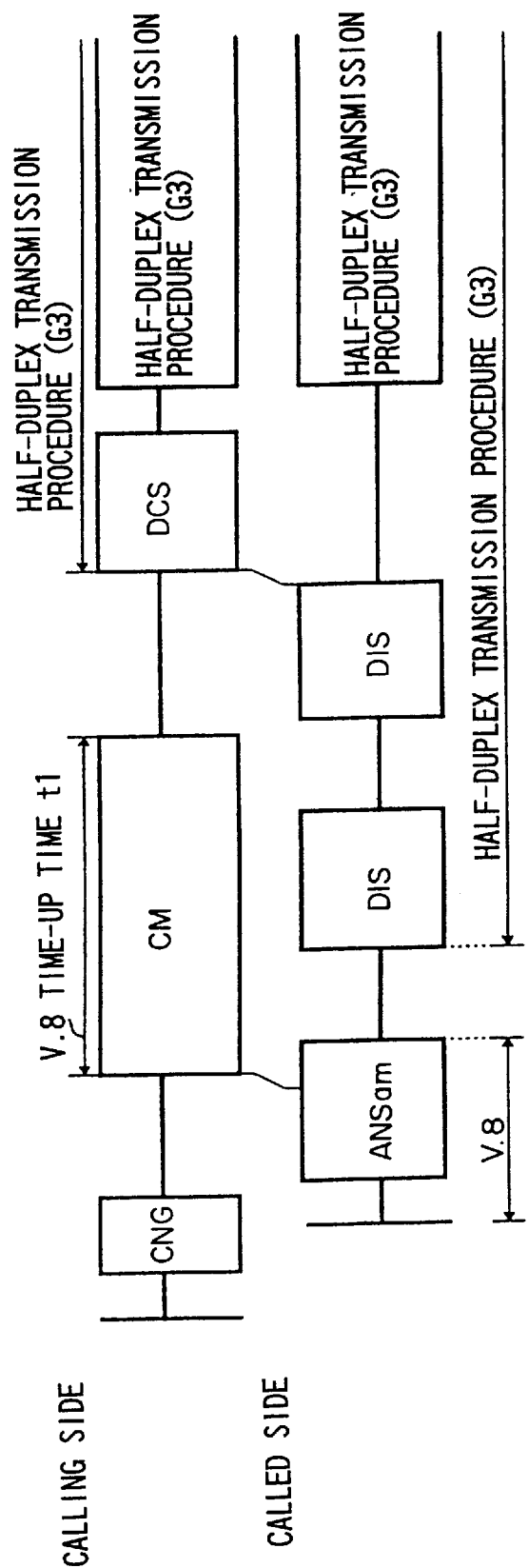
FIG. 8 shows a sequence indicating a first characteristic of the present invention in the case that the communication apparatus 1 is used as the calling station.
Figure 9:
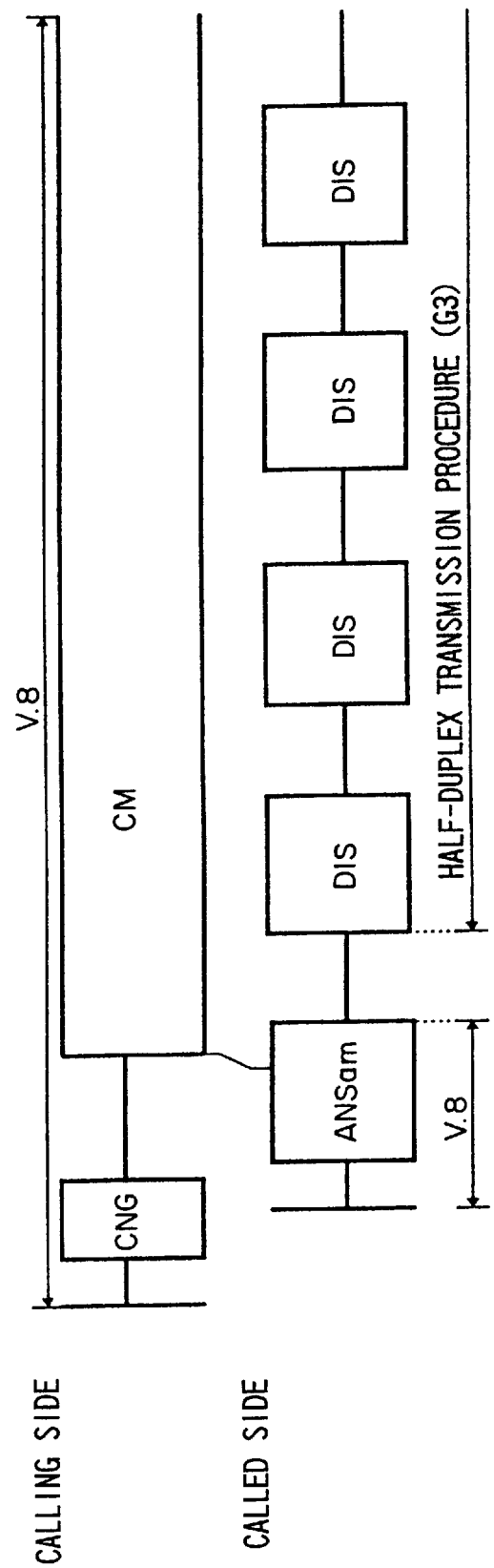
FIG. 9 shows a sequence for a conventional communication apparatus.

In a communication line connected from the communication apparatus 1 used as a calling station to a called station, a first characteristic of the present invention is described below referring to FIG. 8. If the JM signal from the called station is not detected within the predetermined CM signal transmission time t1 while the procedure of Recommendation V.8 is executed, it is estimated that the line condition is improper, and the half-duplex communication operation in accordance with the procedure of Recommendation T.30 instead of Recommendation V.8 is executed. In the case of a conventional communication apparatus, as shown in FIG. 9, the CM signal is transmitted continuously until the JM signal is detected, whereby a longer communication time may be required, or communication errors may occur. With the first characteristic, desired data can be transmitted securely in a shorter time.

Figure 10:
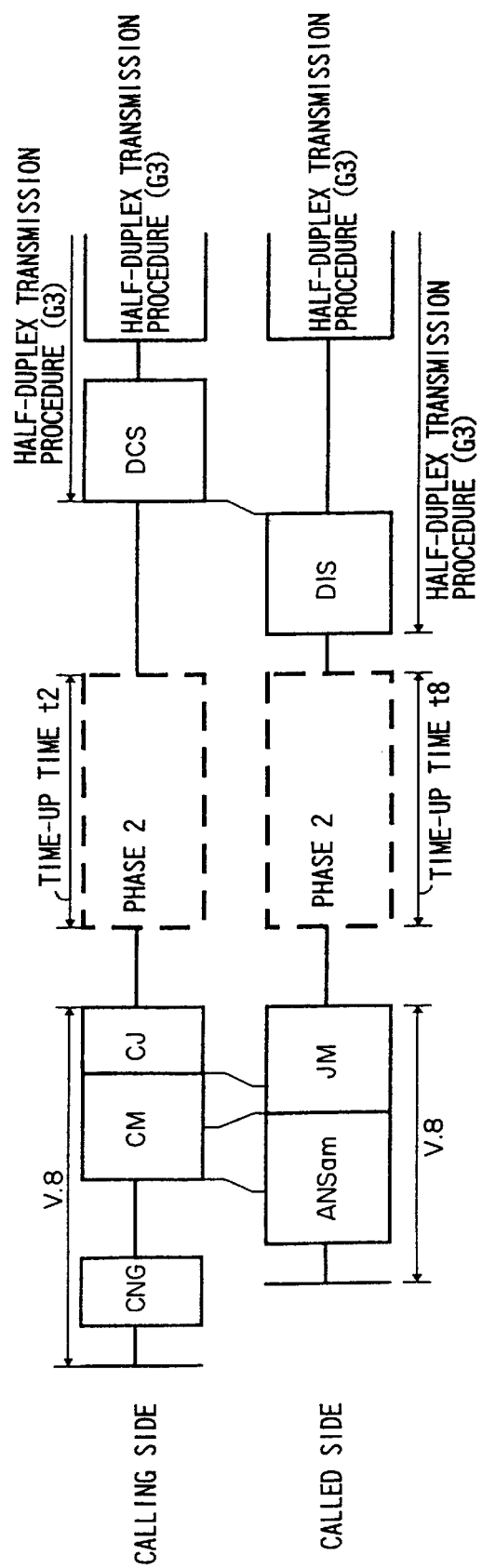
FIG. 10 shows a sequence indicating second and eighth characteristics of the present invention.
Figure 11:
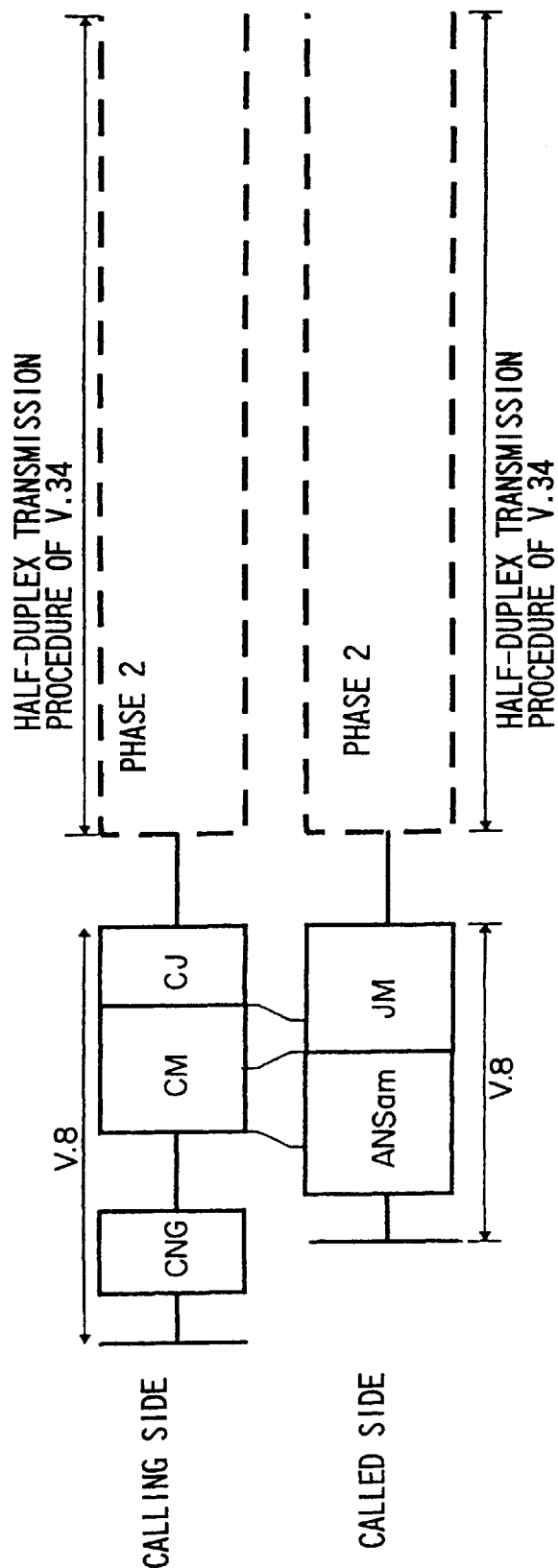
FIG. 11 shows a sequence for the conventional communication apparatus.

Furthermore, a second characteristic of the present invention is, as shown on the calling side in FIG. 10, that while the procedures of Recommendation V.8 and V.34 are executed, when the phase 2 signal of Recommendation V.34 from the called station is not detected within the predetermined time t2 after the end of the procedure of Recommendation V.8, it is estimated that the line condition is improper, and the half-duplex communication operation in accordance with the procedure of Recommendation T.30 instead of Recommendation V.34 is executed. In the case of the conventional communication apparatus, the phase 2 signal is kept waited for as shown on the calling side in FIG. 11, whereby a longer communication time may be required, or communication errors may occur. With the second characteristic, desired data can be transmitted securely in a shorter time.

Figure 12:
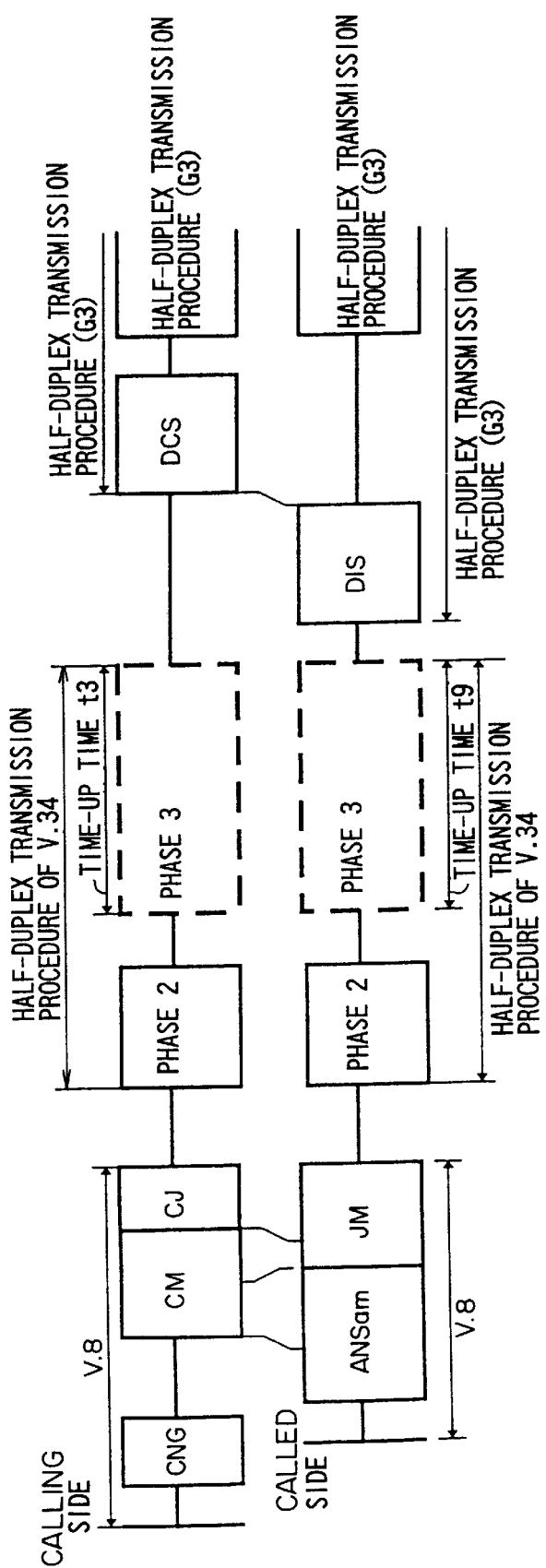
FIG. 12 shows a sequence indicating third and ninth characteristics of the present invention.
Figure 13:
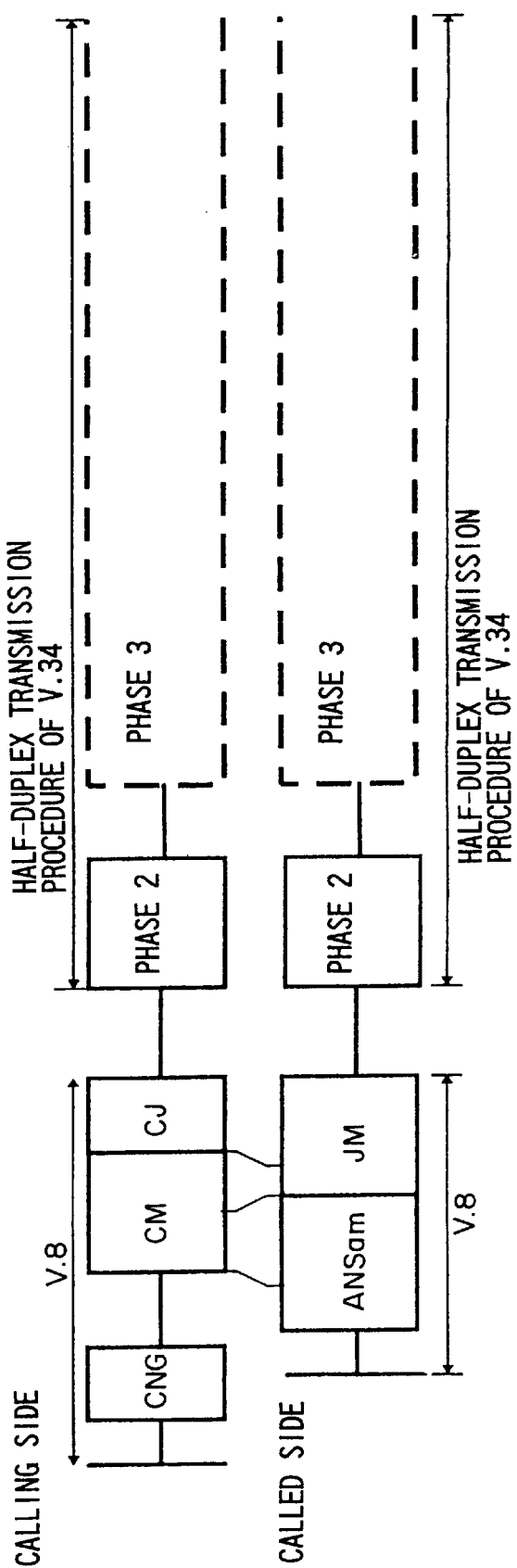
FIG. 13 shows a sequence for the conventional communication apparatus.

Furthermore, a third characteristic of the present invention is, as sown on the calling side in FIG. 12, that while the procedures of Recommendation V.8 and V.34 are executed, when the phase 3 signal of Recommendation V.34 from the called station is not detected within the predetermined time t3 after the end of phase 2 procedure of Recommendation V.34, it is estimated that the line condition is improper, and the half-duplex communication operation in accordance with the procedure of Recommendation T.30 instead of Recommendation V.34 is executed. In the case of the conventional communication apparatus, the phase 3 signal is kept waited for as shown on the calling side in FIG. 13, whereby a longer communication time may be required, or communication errors may occur. With the third characteristic, desired data can be transmitted securely in a shorter time.

Figure 14:
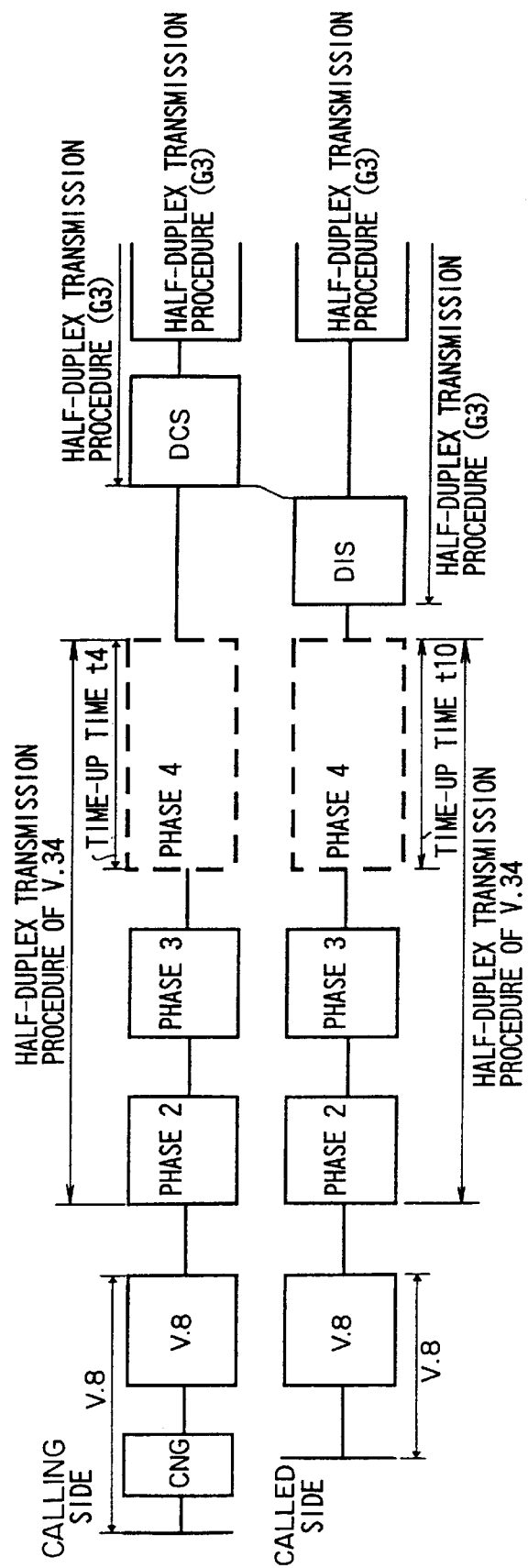
FIG. 14 shows a sequence indicating fourth and tenth characteristics of the present invention.
Figure 15:
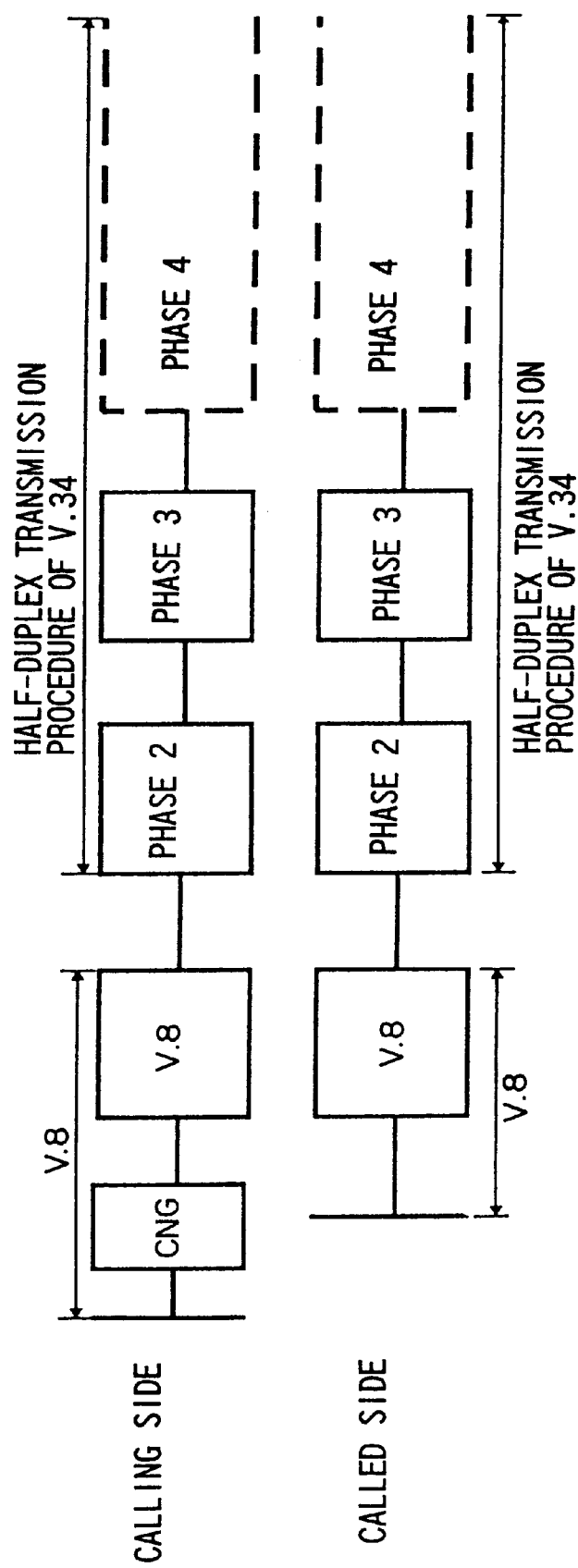
FIG. 15 shows a sequence for the conventional communication apparatus.

Furthermore, a fourth characteristic of the present invention is, as shown on the calling side in FIG. 14, that while the procedures of Recommendations V.8 and V.34 are executed, when the phase 4 signal of Recommendation V.34 from the called station is not detected within the predetermined time t4 after the end of phase 3 procedure of Recommendation V.34, it is estimated that the line condition is improper, and the half-duplex communication operation in accordance with the procedure of Recommendation T.30 instead of Recommendation V.34 is executed. In the case of the conventional communication apparatus, the phase 4 signal is kept waited for as shown on the calling side in FIG. 15, whereby a longer communication time may be required, or communication errors may occur. With the fourth characteristic, desired data can be transmitted securely in a shorter time.

Figure 16:
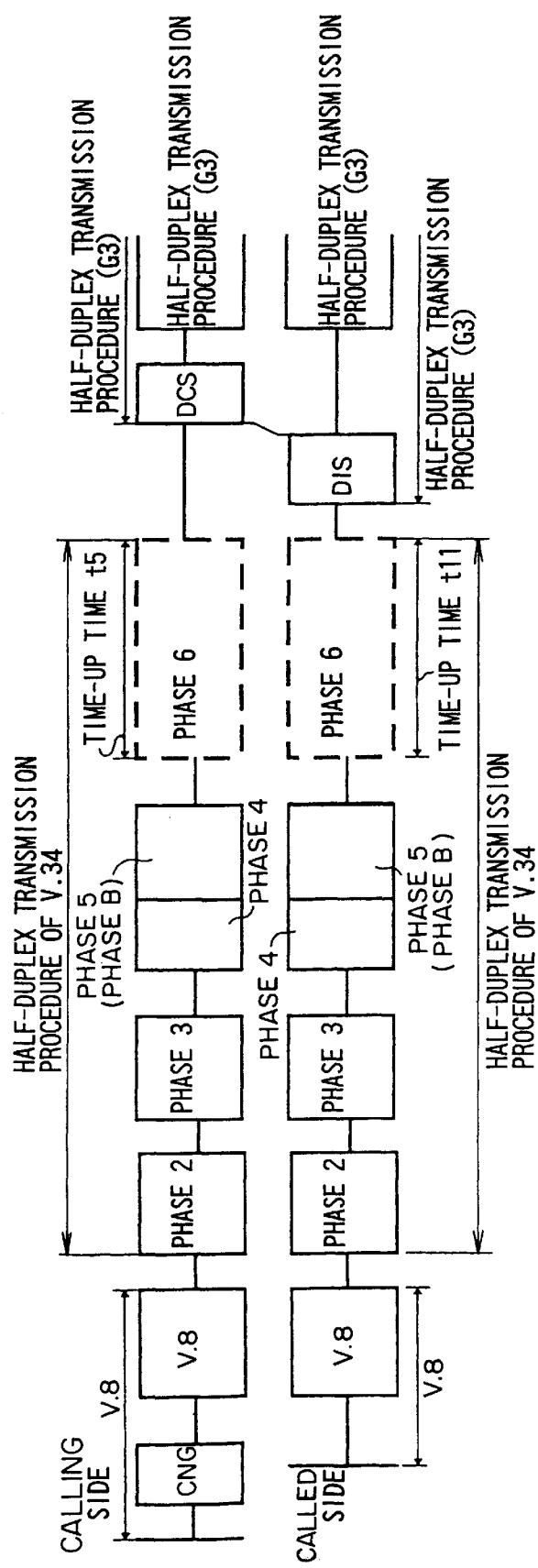
FIG. 16 shows a sequence indicating fifth and eleventh characteristics of the present invention.
Figure 17:
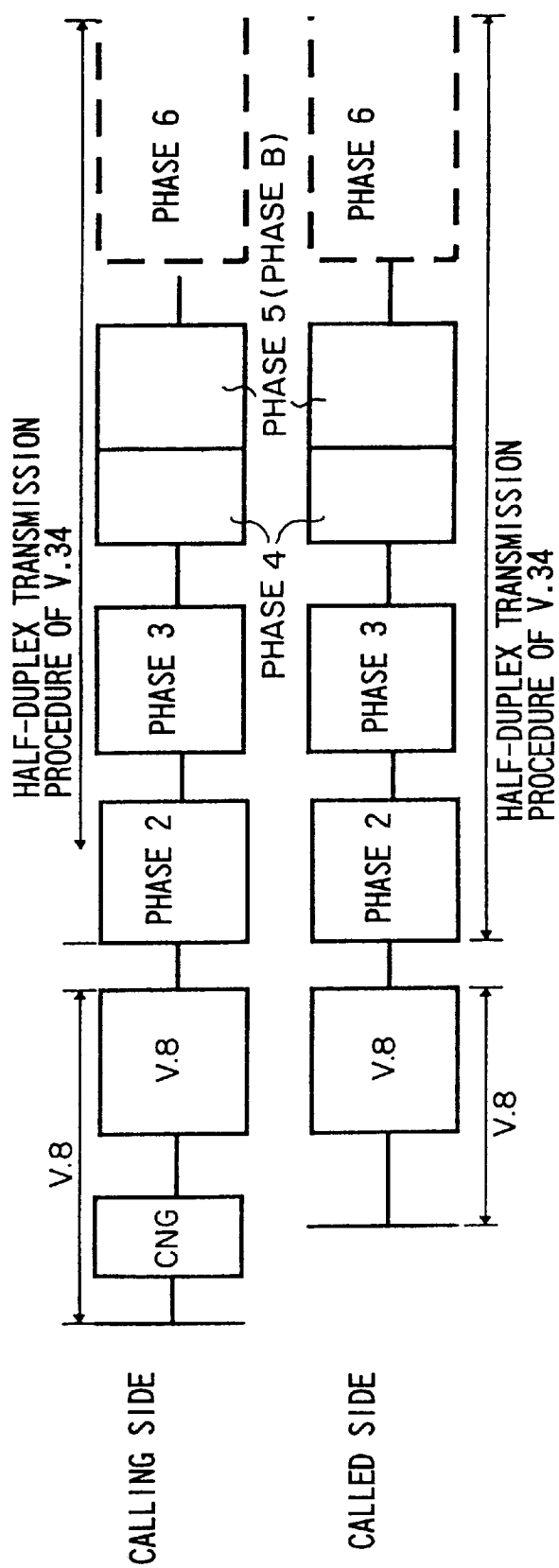
FIG. 17 shows a sequence for the conventional communication apparatus.

Furthermore, a fifth characteristic of the present invention is, as shown on the calling side in FIG. 16, that while the procedures of Recommendations V.8 and V.34 are executed, when the phase 6 signal of Recommendation V.34 from the called station is not detected within the predetermined time t5 after the end of phase 5 (phase B) procedure of Recommendation V.34, it is estimated that the line condition is improper, and the half-duplex communication operation in accordance with the procedure of Recommendation T.30 instead of Recommendation V.34 is executed. In the case of the conventional communication apparatus, the phase 6 signal is kept waited for as shown on the calling side in FIG. 17, whereby a longer communication time may be required, or communication errors may occur. With the fifth characteristic, desired data can be transmitted securely in a shorter time.

Figure 18:
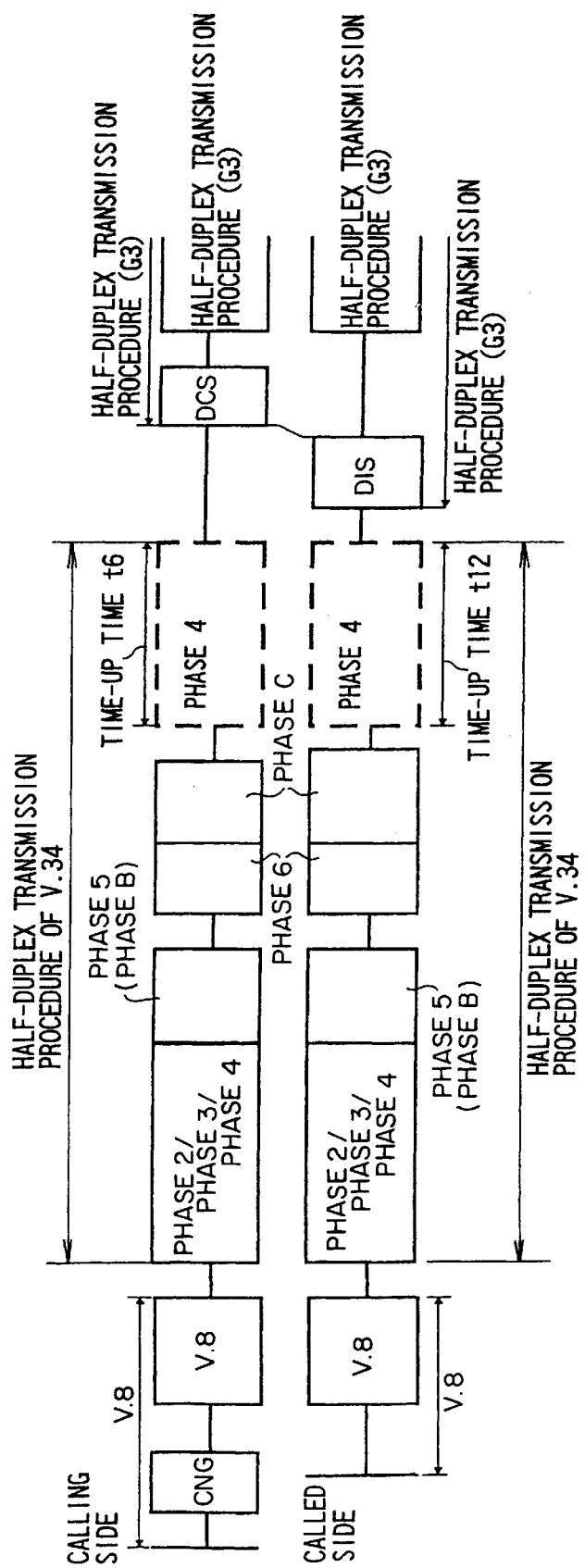
FIG. 18 shows a sequence indicating sixth and twelfth characteristics of the present invention.
Figure 19:
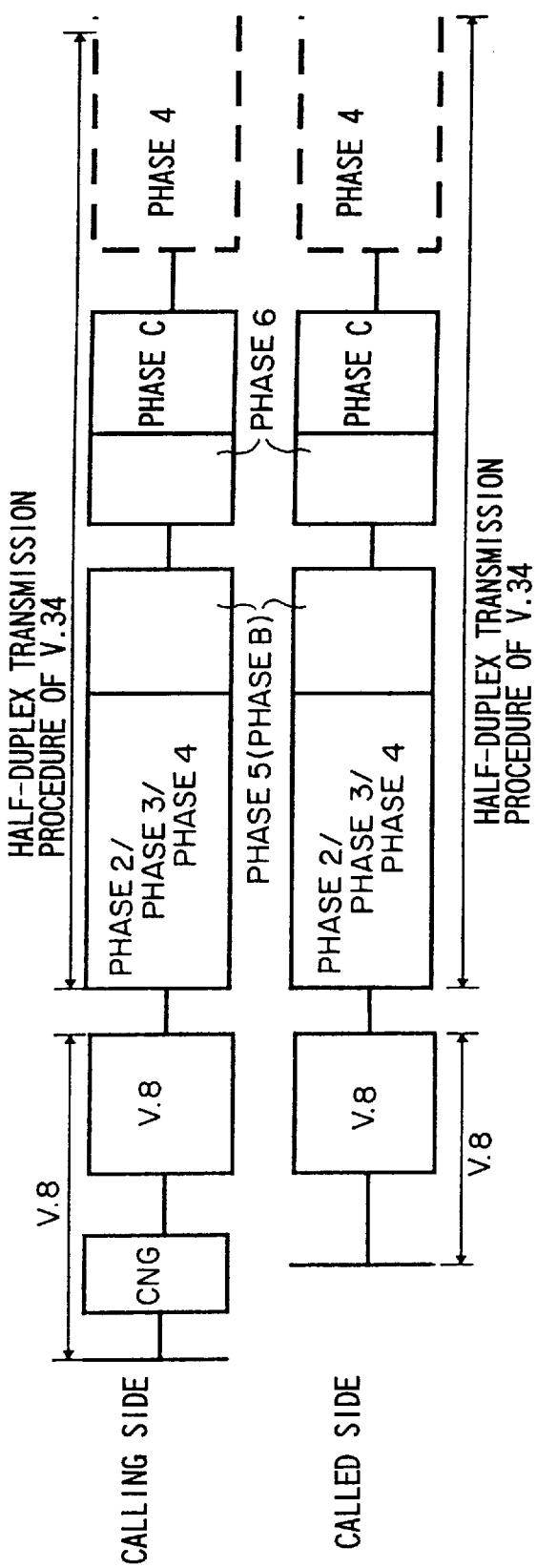
FIG. 19 shows a sequence for the conventional communication apparatus.

Furthermore, a sixth characteristic of the present invention is, as shown on the calling side in FIG. 18, that while the procedures of Recommendations V.8 and V.34 are executed, when the phase 4 (the procedure before the phase D) signal of Recommendation V.34 from the called station is not detected within the predetermined time t6 after the end of phase 6 and phase C procedures of Recommendation V.34, it is estimated that the line condition is improper, and the half-duplex communication operation in accordance with the procedure of Recommendation T.30 instead of Recommendation V.34 is executed. In the case of the conventional communication apparatus, the phase 4 signal is kept waited for as shown on the calling side in FIG. 19, whereby a longer communication time may be required, or communication errors may occur. With the sixth characteristic, desired data can be transmitted securely in a shorter time.

Figure 20:
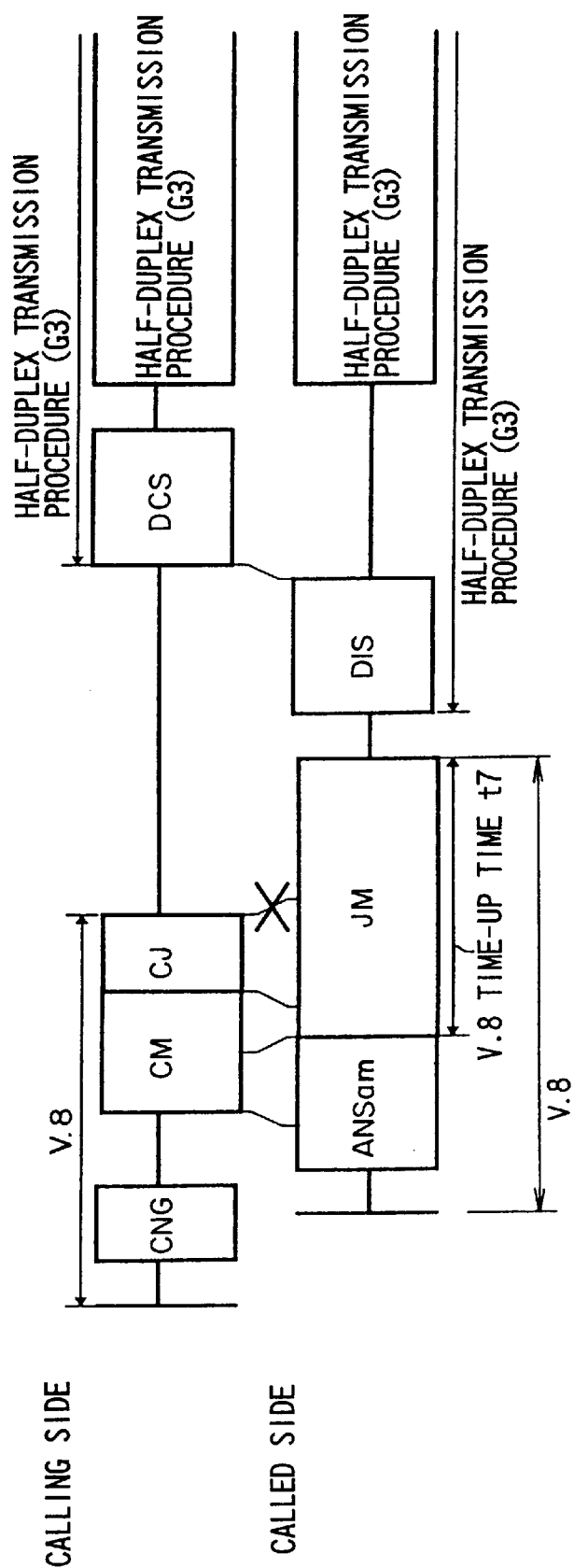
FIG. 20 shows a sequence indicating a seventh characteristic of the present invention.
Figure 21:
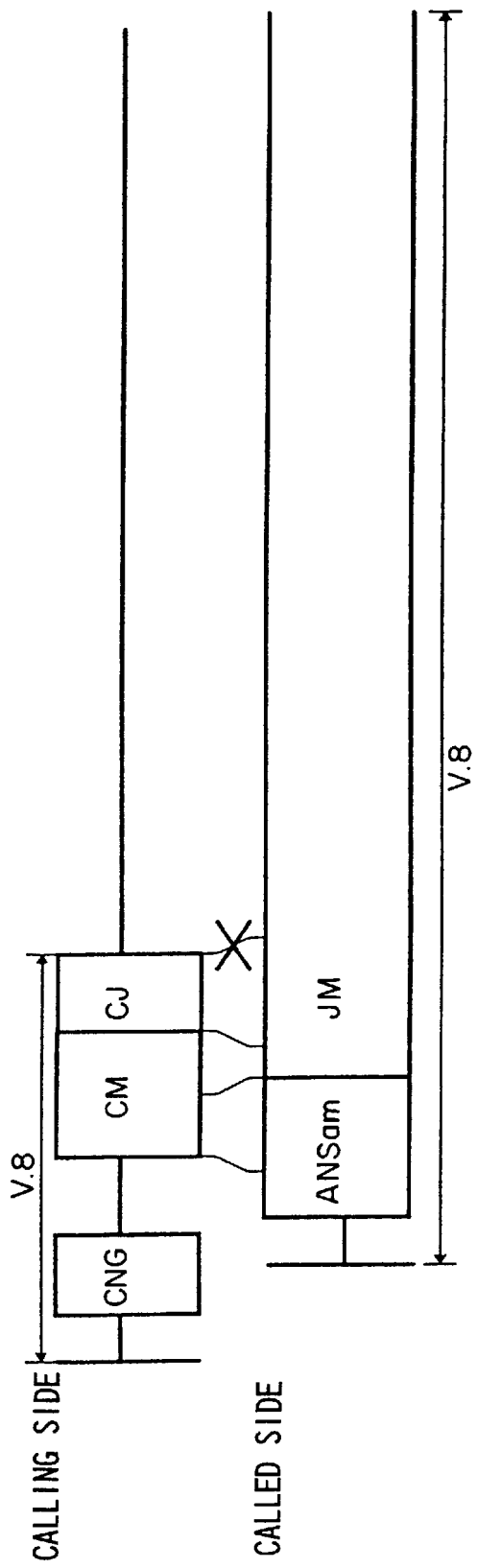
FIG. 21 shows a sequence for the conventional communication apparatus.

In addition, in a communication line connected from the communication apparatus 1 used as a called station to a calling station, a seventh characteristic of the present invention is, as shown in FIG. 20. If the CJ signal from the calling station is not detected within the predetermined JM signal transmission time t7 while the procedure of Recommendation V.8 is executed, it is estimated that the line condition is improper, and the half-duplex communication operation in accordance with the procedure of Recommendation T.30 instead of Recommendation V.8 is executed. In the case of the conventional communication apparatus, the CJ signal is kept waited for as shown in FIG. 21, whereby a longer communication time may be required, or communication errors may occur. With the seventh characteristic, desired data can be transmitted securely in a shorter time.

Furthermore, an eighth characteristic of the present invention is, as shown on the called side in FIG. 10, that while the procedures of Recommendations V.8 and V.34 are executed, when the phase 2 signal of Recommendation V.34 from the calling station is not detected within the predetermined time t8 after the end of the procedure of Recommendation V.8, it is estimated that the line condition is improper, and the half-duplex communication operation in accordance with the procedure of Recommendation T.30 instead of Recommendation V.8 is executed. In the case of the conventional communication apparatus, the phase 2 signal is kept waited for as shown on the called side in FIG. 11, whereby a longer communication time may be required, or communication errors may occur. With the eighth characteristic, desired data can be received securely in a shorter time.

Furthermore, a ninth characteristic of the present invention is, as shown on the called side in FIG. 12, that while the procedures of Recommendations V.8 and V.34 are executed, when the phase 3 signal of Recommendation V.34 from the calling station is not detected within the predetermined time t9 after the end of the procedure of the phase 2 of Recommendation V.34, it is estimated that the line condition is improper, and the half-duplex communication operation in accordance with the procedure of Recommendation T.30 instead of Recommendation V.8 is executed. In the case of the conventional communication apparatus, the phase 3 signal is kept waited for as shown on the called side in FIG. 13, whereby a longer communication time may be required, or communication errors may occur. With the ninth characteristic, desired data can be received securely in a shorter time.

Furthermore, a tenth characteristic of the present invention is, as shown on the called side in FIG. 14, that while the procedures of Recommendation V.8 and V.34 are executed, when the phase 4 signal of Recommendation V.34 from the calling station is not detected within the predetermined time t10 after the end of phase 3 procedure of Recommendation V.34, it is estimated that the line condition is improper, and the half-duplex communication operation in accordance with the procedure of Recommendation T.30 instead of Recommendation V.8 is executed. In the case of the conventional communication apparatus, the phase 4 signal is kept waited for as shown on the called side in FIG. 15, whereby a longer communication time may be required, or communication errors may occur. With the tenth characteristic, desired data can be received securely in a shorter time.

Furthermore, an eleventh characteristic of the present invention is, as shown on the called side in FIG. 16, that while the procedures of Recommendations V.8 and V.34 are executed, when the phase 6 signal of Recommendation V.34 from the calling station is not detected within the predetermined time t11 after the end of phase 5 (phase B) procedure of Recommendation V.34, it is estimated that the line condition is improper, and the half-duplex communication operation in accordance with the procedure of Recommendation T.30 instead of Recommendation V.8 is executed. In the case of the conventional communication apparatus, the phase 6 signal is kept waited for as shown on the called side in FIG. 17, whereby a longer communication time may be required, or communication errors may occur. With the eleventh characteristic, desired data can be received securely in a shorter time.

Furthermore, a twelfth characteristic of the present invention is, as shown on the called side in FIG. 18, that while the procedures of Recommendations V.8 and V.34 are executed, when the phase 4 (the procedure before the phase D) signal of Recommendation V.34 from the calling station is not detected within the predetermined time t12 after the end of phase 6 and phase C procedures of Recommendation V.34, it is estimated that the line condition is improper, and the half-duplex communication operation in accordance with the procedure of Recommendation T.30 instead of Recommendation V.8 is executed. In the case of the conventional communication apparatus, the phase 4 signal is kept waited for as shown on the called side in FIG. 19, whereby a longer communication time may be required, or communication errors may occur. With the twelfth characteristic, desired data can be received securely in a shorter time.

Consequently, with the first to twelfth characteristics, desired data can be transmitted and received securely at low communication cost.

Figure 22:
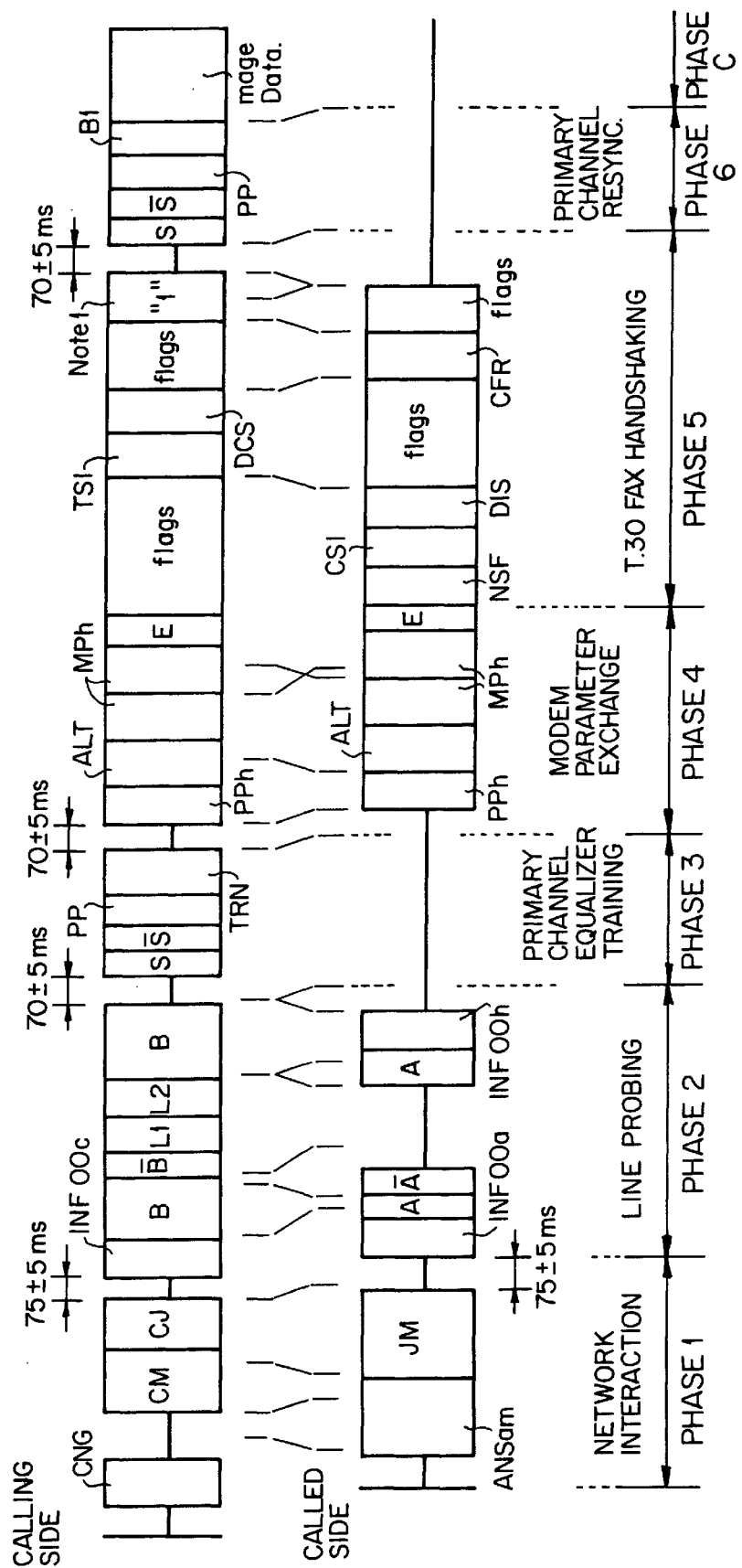
FIG. 22 is a view showing the sequences of the communication apparatuss at the calling and called stations in the case that the procedures of Recommendations V.8 and V.34 are ended normally.
Figure 23:
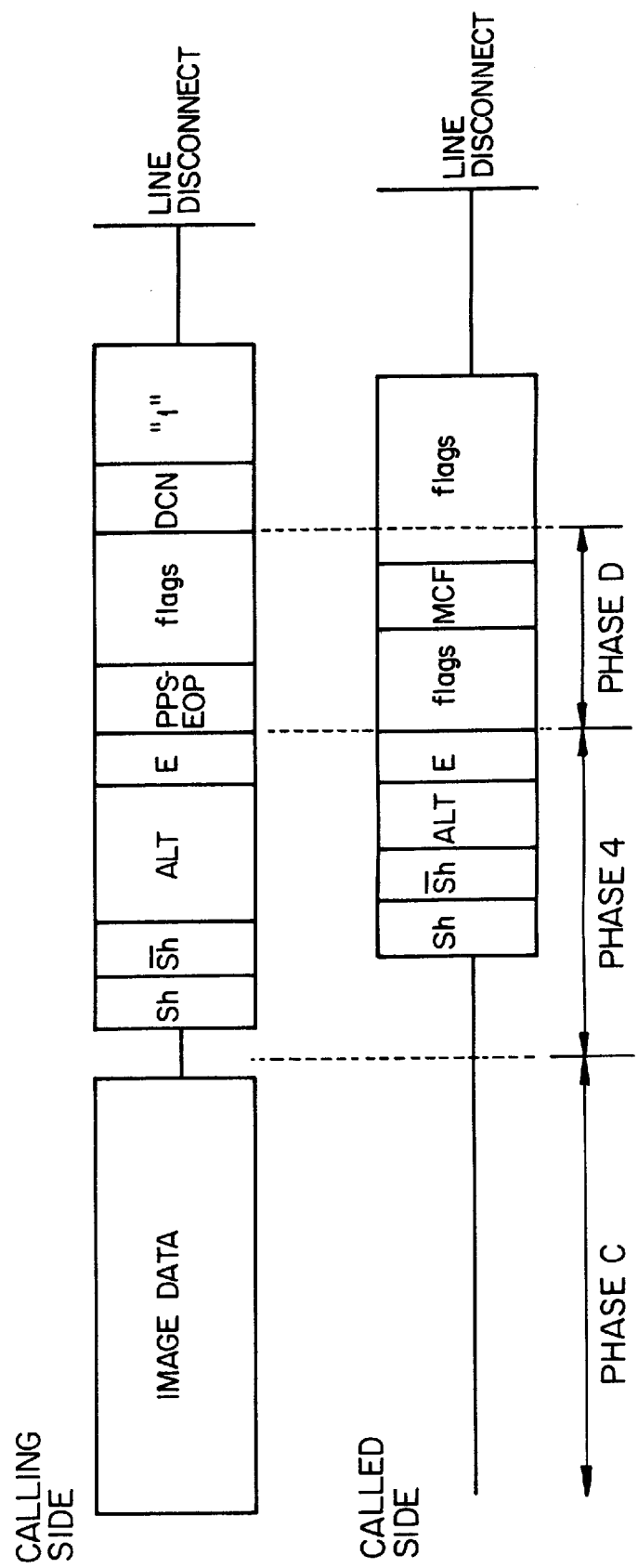
FIG. 23 is a view showing the sequences of the communication apparatuss at the calling and called stations in the case that the procedures of Recommendations V.8 and V.34 are ended normally.

FIGS. 22 and 23 are views showing the sequences of the communication apparatuss at the calling and called stations in the case that the procedures of Recommendations V.8 and V.34 are ended normally. The communication apparatuss execute the procedures of the phases 1 to 6, C, 4 and D as defined by ITU-T, thereby ending the communication in accordance with the procedures of Recommendations V.8 and V.34. In the sequences of the phases 1 to 4, calling is set, and a communication line is established. The phases correspond to the sequences of Network Interaction, Line Probing, Primary Channel Equalizer Training and Modem Parameter Exchange, respectively. The following phases 5 and 6 correspond to sequences for confirming the conditions of terminals and transmission lines during the preprocessing of communication and for controlling the terminals, that is, T.30 Fax Handshaking and Primary Channel Resync, respectively. The further following phase C corresponds to a sequence for transmitting a facsimile message and for performing control during the transmission of the message. In addition, the further following phase D corresponds to a sequence for ending the transmission of the message and for confirming the reception of the message.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication apparatus capable of carrying out communication with a destination communication apparatus in accordance with procedures of Recommendations T.30, V.8 and V.34 of ITU-T, comprising:

detection means for detecting a JM (common menu) signal from a called station within a predetermined transmission time t1 for a CM (calling menu) signal transmitted by the communication apparatus while a communication line connected from the communication apparatus used as a calling station to the called station and the procedure of Recommendation V.8 is executed; and control means for interrupting the execution of the procedure of Recommendation V.8 and executing the half-duplex communication operation in accordance with the procedure of Recommendation T.30, when the JM signal is not detected within the CM signal transmission time t1.

2. A communication apparatus capable of carrying out communication with a destination communication apparatus in accordance with procedures of Recommendations T.30, V.8 and V.34 of ITU-T, comprising:

detection means for detecting the phase 2 signal of Recommendation V.34 from a called station within a predetermined time t2 after the end of the procedure of Recommendation V.8 at the communication apparatus while a communication line is connected from the communication apparatus used as a calling station to the called station and the procedures of Recommendations V.8 and V.34 are executed; and control means for interrupting the execution of the procedure of Recommendation V.34 and executing the half-duplex communication operation in accordance with the procedure of Recommendation T.30, when the phase 2 of Recommendation V.34 is not detected within the predetermined time t2.

3. A communication apparatus capable of carrying out communication with a destination communication apparatus in accordance with procedures of Recommendations T.30, V.8 and V.34 of ITU-T, comprising:

detection means for detecting the phase 3 signal of Recommendation V.34 from a called station within a predetermined time t3 after the end of phase 2 procedure of Recommendation V.34 at the communication apparatus while a communication line is connected from the communication apparatus used as a calling station to the called station and the procedures of Recommendations V.8 and V.34 are executed; and control means for interrupting the execution of the procedure of Recommendation V.34 and executing the half-duplex communication operation in accordance with the procedure of Recommendation T.30, when the phase 3 of Recommendation V.34 is not detected within the predetermined time t3.

4. A communication apparatus capable of carrying out communication with a destination communication apparatus in accordance with procedures of Recommendations T.30, V.8 and V.34 of ITU-T, comprising:

detection means for detecting the phase 4 signal of Recommendation V.34 from a called station within a predetermined time t4 after the end of the procedure of the phase 3 of Recommendation V.34 at the communication apparatus while a communication line is connected from the communication apparatus used as a calling station to the called station and the procedures of Recommendations V.8 and V.34 are executed; and control means for interrupting the execution of the procedure of Recommendation V.34 and executing the half-duplex communication operation in accordance with the procedure of Recommendation T.30, when the phase 4 signal of Recommendation V.34 is not detected within the predetermined time t4.

5. A communication apparatus capable of carrying out communication with a destination communication apparatus in accordance with procedures of Recommendations T.30, V.8 and V.34 of ITU-T, comprising:

detection means for detecting the phase 6 signal of Recommendation V.34 from a called station within a predetermined time t5 after the end of the procedure of the phase 5 (the phase B) of Recommendation V.34 at the communication apparatus while a communication line is connected from the communication apparatus used as a calling station to the called station and the procedures of Recommendations V.8 and V.34 are executed; and control means for interrupting the execution of the procedure of Recommendation V.34 and executing the half-duplex communication operation in accordance with the procedure of Recommendation T.30, when the phase 6 of Recommendation V.34 is not detected within the predetermined time t5.

6. A communication apparatus capable of carrying out communication with a destination communication apparatus in accordance with procedures of Recommendations T.30, V.8 and V.34 of ITU-T, comprising:

detection means for detecting the phase 4 (a procedure before the phase D) signal of Recommendation V.34 from a called station within a predetermined time t6 after the end of the procedures of the phase 6 and the phase C of Recommendation V.34 at the communication apparatus while a communication line is connected from the communication apparatus used as a calling station to the called station and the procedures of Recommendations V.8 and V.34 are executed; and control means for interrupting the execution of the procedure of Recommendation V.34 and executing the half-duplex communication operation in accordance with the procedure of Recommendation T.30 when the phase 4 signal of Recommendation V.34 is not detected within the predetermined time t6.

7. A communication apparatus capable of carrying out communication with a destination communication apparatus in accordance with procedures of Recommendations T.30, V.8 and V.34 of ITU-T, comprising:

detection means for detecting a CJ (CM terminator) signal from a calling station within a predetermined transmission time t7 for a JM (common menu) signal transmitted by the communication apparatus while a communication line is connected from the communication apparatus used as a called station to the calling station and the procedure of Recommendation V.8 is executed; and control means for interrupting the execution of the procedure of Recommendation V.8 and executing the half-duplex communication operation in accordance with the procedure of Recommendation T.30, when the CJ signal is not detected within the JM signal transmission time t7.

8. A communication apparatus capable of carrying out communication with a destination communication apparatus in accordance with procedures of Recommendations T.30, V.8 and V.34 of ITU-T, comprising:

detection means for detecting the phase 2 signal of Recommendation V.34 from a calling station within a predetermined time t8 after the end of the procedure of Recommendation V.8 at the communication apparatus while a communication line is connected from the communication apparatus used as a called station to the calling station and the procedures of Recommendations V.8 and V.34 are executed; and control means for interrupting the execution of the procedure of Recommendation V.34 and executing the half-duplex communication operation in accordance with the procedure of Recommendation T.30, when the phase 2 signal of Recommendation V.34 is not detected within the predetermined time t8.

9. A communication apparatus capable of carrying out communication with a destination communication apparatus in accordance with procedures of Recommendations T.30, V.8 and V.34 of ITU-T, comprising:

detection means for detecting the phase 3 signal of Recommendation V.34 from a calling station within a predetermined time t9 after the end of the procedure of the phase 2 of Recommendation V.34 at the communication apparatus while a communication line is connected from the communication apparatus used as a called station to the calling station and the procedures of Recommendations V.8 and V.34 are executed; and control means for interrupting the execution of the procedure of Recommendation V.34 and executing the half-duplex communication operation in accordance with the procedure of Recommendation T.30, when the phase 3 signal of Recommendation V.34 is not detected within the predetermined time t9.

10. A communication apparatus capable of carrying out communication with a destination communication apparatus in accordance with procedures of Recommendations T.30, V.8 and V.34 of ITU-T, comprising:

detection means for detecting the phase 4 signal of Recommendation V.34 from a calling station within a predetermined time t10 after the end of the procedure of the phase 3 of Recommendation V.34 at the communication apparatus while a communication line is connected from the communication apparatus used as a called station to the calling station and the procedures of Recommendations V.8 and V.34 are executed; and control means for interrupting the execution of the procedure of Recommendation V.34 and executing the half-duplex communication operation in accordance with the procedure of Recommendation T.30, when the phase 4 signal of Recommendation V.34 is not detected within the predetermined time t10.

11. A communication apparatus capable of carrying out communication with a destination communication apparatus in accordance with procedures of Recommendations T.30, V.8 and V.34 of ITU-T, comprising:

detection means for detecting the phase 6 signal of Recommendation V.34 from a calling station within a predetermined time t11 after the end of the procedure of the phase 5 (the phase B) of Recommendation V.34 at the communication apparatus while a communication line is connected from the communication apparatus used as a called station to the calling station and the procedures of Recommendations V.8 and V.34 are executed; and control means for interrupting the execution of the procedure of Recommendation V.34 and executing the half-duplex communication operation in accordance with the procedure of Recommendation T.30, when the phase 6 signal of Recommendation V.34 is not detected within the predetermined time t11.

12. A communication apparatus capable of carrying out communication with a destination communication apparatus in accordance with procedures of Recommendations T.30, V.8 and V.34 of ITU-T, comprising:

detection means for detecting the phase 4 (the procedure before the phase D) signal of Recommendation V.34 from a calling station within a predetermined time t12 after the end of the procedures of the phase 6 and the phase C of Recommendation V.34 at the communication apparatus while a communication line is connected from the communication apparatus used as a called station to the calling station and the procedures of Recommendations V.8 and V.34 are executed; and control means for interrupting the execution of the procedure of Recommendation V.34 and executing the half-duplex communication operation in accordance with the procedure of Recommendation T.30, when the phase 4 signal of Recommendation V.34 is not detected within the predetermined time t12.

* * * * *